(12) United States Patent
Smith, Jr. et al.

(10) Patent No.: US 8,791,587 B2
(45) Date of Patent: Jul. 29, 2014

(54) AIRFLOW POWER GENERATOR

(75) Inventors: Edgar A. Smith, Jr., Ann Arbor, MI (US); Patrick S. Smith, Nunica, MI (US)

(73) Assignee: US Green Energy Solutions, LLC, Livonia, MI (US)

( * ) Notice: Subject to any disclaimer, the term of this patent is extended or adjusted under 35 U.S.C. 154(b) by 146 days.

(21) Appl. No.: 13/206,902

(22) Filed: Aug. 10, 2011

(65) Prior Publication Data

US 2012/0038162 A1    Feb. 16, 2012

Related U.S. Application Data

(60) Provisional application No. 61/372,172, filed on Aug. 10, 2010.

(51) Int. Cl.
   *F03B 13/00*    (2006.01)

(52) U.S. Cl.
   USPC ........................................................ 290/54

(58) Field of Classification Search
   USPC ................................. 290/43, 54, 52
   See application file for complete search history.

(56) References Cited

U.S. PATENT DOCUMENTS

| | | | | |
|---|---|---|---|---|
| 7,969,035 B2 * | 6/2011 | Agtuca | ........................... | 290/54 |
| 8,253,267 B2 * | 8/2012 | Gilbert | ........................... | 290/55 |
| 2009/0001731 A1 | 1/2009 | Perlo et al. | | |
| 2009/0284018 A1 | 11/2009 | Ellis | | |
| 2011/0025057 A1 * | 2/2011 | Agtuca | ........................... | 290/43 |

FOREIGN PATENT DOCUMENTS

| | | |
|---|---|---|
| WO | 2004090328 A1 | 10/2004 |
| WO | 2012021602 A2 | 2/2012 |
| WO | 2012021602 A3 | 4/2012 |

OTHER PUBLICATIONS

PCT/US2011/047228, International Application Serial No. PCT/US2011/047228, International Preliminary Report on Patentability mailed Feb. 21, 2013, US Green Energy Solutions, LLC, 8 pages.
PCT/US2011/047228, International Application Serial No. PCT/US2011/047228, International Search Report mailed Feb. 17, 2012, 10 pages.

* cited by examiner

*Primary Examiner* — Tho D Ta
(74) *Attorney, Agent, or Firm* — GTC Law Group LLP & Affiliates

(57) ABSTRACT

Converting an air flow into a source of electricity by an airflow generator includes disposing the airflow generator in an air flow path of a machine for receiving the air flow to rotate a turbine bladed portion of the airflow generator that causes a plurality of permanent magnets disposed along the circumference of the bladed portion to cyclically move in close proximity to a plurality of fixed position stator coils thereby generating electrical currents in the coils that can be harvested.

17 Claims, 27 Drawing Sheets

AIRFLOW POWER GENERATOR

CROSS-REFERENCE TO RELATED APPLICATIONS

This application claims the benefit of provisional application U.S. Ser. No. 61/372,172 filed Aug. 10, 2010 which is hereby incorporated by reference in its entirety.

BACKGROUND

1. Field

An airflow generator is in the technical field of Renewable Energy Devices, more particularly, an airflow generator is in the technical field of generating electricity from a turbine using natural or manmade air flow sources.

2. Description of the Related Art

As the demand for energy continues to rise, the existing infrastructure continues to age and our natural resources continue to shrink. Energy inefficiency and emissions associated with the heating, cooling, and operation of commercial, industrial, institutional and residential buildings have an increasing impact on the environment. Air flow associated with systems that have an increasing impact on the environment generally provide little secondary benefit, yet there is a potential to efficiently capture energy of these airflows.

SUMMARY

Methods and systems are described herein that include a method of converting an air flow into a source of electricity. The method may include receiving the air flow generated by a machine with an airflow generator disposed in an air flow path of the machine. The machine may be selected from an air conditioner condenser, a blower, a furnace, an air conditioner, a gas turbine, an exhaust, a moving vehicle, a fan, and the like. Further, the exhaust may be produced from one of a chimney, a generator, a laboratory, an engine, and the like. The moving vehicle may include at least one of a ship, a ferry, a barge, a boat, a trawler, a truck, a cargo van, a trailer, a tractor, a plane, and the like.

The method may also include disposing a plurality of permanent magnets on a rotatable portion of an airflow generator. The rotatable portion may be rotatable in response to the received air flow. The plurality of permanent magnets may be disposed along a circumference of the rotating portion of the airflow generator. The plurality of permanent magnets may be disposed at substantially equal distances from one another along the circumference. Further, the method may include converting the air flow to electricity by the rotatable portion moving the plurality of permanent magnets in close proximity to a plurality of stator coils that may be disposed on a stationary portion of the airflow generator.

Another embodiment provides a method of converting an air flow into a source of electricity. The method may include receiving the air flow generated by a machine with an airflow generator comprising a ventilator cowl disposed in an air flow path of the machine. The machine may be selected from at least one of an air conditioner condenser, a blower, a furnace, an air conditioner, a gas turbine, an exhaust, a moving vehicle, a fan, and the like. Further, the exhaust may be produced from one of a chimney, a generator, a laboratory, and an engine. The moving vehicle may include at least one of a ship, a ferry, a barge, a boat, a trawler, a truck, a cargo van, a trailer, a tractor, a plane, and the like.

The method may also include disposing a plurality of permanent magnets on a rotatable portion of the airflow generator. The ventilator cowl configured to facilitate rotating the rotatable portion in response to the received air flow. Further, the method may include converting the air flow to electricity by the rotatable portion moving the plurality of permanent magnets in close proximity to a plurality of stator coils that may be disposed on a stationary portion of the airflow generator.

Yet another embodiment provides a method of converting an air flow into a source of electricity. The method may include receiving the air flow generated by a machine with an airflow generator disposed in an air flow path of the machine. The machine may be selected from an air conditioner condenser, a blower, a furnace, an air conditioner, a gas turbine, an exhaust, a moving vehicle, a fan, and the like. Further, the exhaust may be produced from one of a chimney, a generator, a laboratory, an engine, and the like. The moving vehicle may include at least one of a ship, a ferry, a barge, a boat, a trawler, a truck, a cargo van, a trailer, a tractor, a plane, and the like. The method may also include continuously venting the air flow to at least one of mitigate the airflow generator induced backpressure and augment air flow toward a rotatable portion of the airflow generator. The continuous venting may be facilitated by a continuous venting port. Further, the continuous venting port may be disposed between the machine and the rotatable portion of the airflow generator. In an embodiment, the air may flow outwards through the continuous venting port when the air flow generated by the machine may be less than 12,000 cubic feet per minute. In another embodiment, the air may flow inwards through the continuous venting port when the air flow generated by the machine may be more than 13,000 cubic feet per minute.

Further, the method may include a venturi air flow restrictor disposed in the air flow between the machine and the rotatable portion of the airflow generator. The continuous venting port may be adapted to transfer energy from ambient air currents to the airflow generator. The ambient air currents may not require generation by the machine. The airflow generator may be disposed proximal to an air outlet port of the machine and the air flow may include air that has passed through the air outlet port. The airflow generator is disposed proximal to an air inlet port of the machine and the air flow includes air that may be flowing into the air inlet port. The airflow generator may further comprise a fixed drive shaft configured to facilitate rotation of the rotatable portion. The method may also include disposing a plurality of permanent magnets on the rotatable portion of the airflow generator that is rotatable in response to the received air flow. The method may also include converting the air flow to electricity by the rotatable portion moving the plurality of permanent magnets in close proximity to a plurality of stator coils that may be disposed on a stationary portion of the airflow generator.

According to another embodiment of an airflow generator, a method of machine generated energy conversion and feedback is provided. The method may include receiving an air flow generated by a machine with an airflow generator disposed in an air flow path of the machine. The machine may be selected from an air conditioner condenser, a blower, a furnace, an air conditioner, a gas turbine, an exhaust, a moving vehicle, a fan, and the like. Further, the exhaust may be produced from one of a chimney, a generator, a laboratory, an engine, and the like. The moving vehicle may include at least one of a ship, a ferry, a barge, a boat, a trawler, a truck, a cargo van, a trailer, a tractor, a plane, and the like.

The method may also include disposing a plurality of permanent magnets on a rotatable portion of the airflow generator. The rotatable portion rotatable in response to the received air flow. The plurality of permanent magnets may be disposed along a circumference of the rotating portion of the airflow generator. The plurality of permanent magnets may be disposed at substantially equal distances from one another along the circumference. Further, the method may include converting energy from the air flow to electricity by the rotatable portion moving the plurality of permanent magnets in close proximity to a plurality of stator coils that may be disposed on a stationary portion of the airflow generator and feeding the electricity back into the machine for powering electrically powered portions of the machine.

Yet another embodiment provides a method of machine generated energy conversion and feedback. The method may include receiving an air flow generated by a machine with an airflow generator comprising a ventilator cowl disposed in an air flow path of the machine. The machine may be selected from at least one of an air conditioner condenser, a blower, a furnace, an air conditioner, a gas turbine, an exhaust, a moving vehicle, a fan, and the like. Further, the exhaust may be produced from one of a chimney, a generator, a laboratory, and an engine. The moving vehicle may include at least one of a ship, a ferry, a barge, a boat, a trawler, a truck, a cargo van, a trailer, a tractor, a plane, and the like.

The method may also include disposing a plurality of permanent magnets on a rotatable portion of the airflow generator. The ventilator cowl configured to facilitate rotating the rotatable portion in response to the received air flow. Further, the method may include converting energy from the air flow to electricity by the rotatable portion moving the plurality of permanent magnets in close proximity to a plurality of stator coils that may be disposed on a stationary portion of the airflow generator and feeding the electricity back into the machine for powering electrically powered portions of the machine.

According to yet another embodiment a method of machine generated energy conversion and feedback is provided. The method may include receiving an air flow generated by a machine with an airflow generator disposed in an air flow path of the machine. The machine may be selected from an air conditioner condenser, a blower, a furnace, an air conditioner, a gas turbine, an exhaust, a moving vehicle, a fan, and the like. Further, the exhaust may be produced from one of a chimney, a generator, a laboratory, an engine, and the like. The moving vehicle may include at least one of a ship, a ferry, a barge, a boat, a trawler, a truck, a cargo van, a trailer, a tractor, a plane, and the like. The method may also include continuously venting the air flow to at least one of mitigate the airflow generator induced static pressure and augment air flow toward a rotatable portion of the airflow generator. The continuous venting may be facilitated by a continuous venting port. Further, the continuous venting port may be disposed between the machine and the rotatable portion of the airflow generator. In an embodiment, the air may flow outwards through the continuous venting port when the air flow generated by the machine may be less than 12,000 cubic feet per minute. In an embodiment, the air may flow inwards through the continuous venting port when the air flow generated by the machine may be more than 13,000 cubic feet per minute.

Further, the method may include a venturi air flow restrictor disposed in the air flow between the machine and the rotatable portion of the airflow generator. The continuous venting port may be adapted to transfer energy from ambient air currents to the airflow generator. The ambient air currents may not require generation by the machine. The airflow generator may be disposed proximal to an air outlet port of the machine and the air flow may include air that has passed through the air outlet port. The airflow generator is disposed proximal to an air inlet port of the machine and the air flow includes air that may be flowing into the air inlet port. The airflow generator may further comprise a fixed drive shaft configured to facilitate rotation of the rotatable portion. The method may also include disposing a plurality of permanent magnets on the rotatable portion of the airflow generator that is rotatable in response to the received air flow. The method may also include converting the air flow to electricity by the rotatable portion moving the plurality of permanent magnets in close proximity to a plurality of stator coils that may be disposed on a stationary portion of the airflow generator and feeding the electricity back into the machine for powering electrically powered portions of the machine.

According to still another embodiment, a method of converting plenum air flow into electricity is provided. The method may include disposing an airflow generator at one of an entry and an exit of a plenum for receiving air flowing through the plenum. The method may also include disposing a plurality of permanent magnets on a rotatable portion of the airflow generator. The rotatable portion rotatable in response to the received air flow. The plurality of permanent magnets may be disposed along a circumference of the rotating portion of the airflow generator. Further, the plurality of permanent magnets may also be disposed at substantially equal distances from one another along the circumference. The method may further include converting energy from the air flow to electricity by the rotatable portion moving the plurality of permanent magnets in close proximity to a plurality of stator coils that may be disposed on a stationary portion of the airflow generator.

In yet another embodiment of an airflow generator a method of converting plenum air flow into electricity is provided. The method may include disposing an airflow generator at one of an entry and an exit of a plenum for receiving air flowing through the plenum. The method may also include disposing a plurality of permanent magnets on a rotatable portion of an airflow generator. The ventilator cowl configured to facilitate rotating the rotatable portion in response to the received air flow. Further, the method may include converting energy from the air flow to electricity by the rotatable portion moving the plurality of permanent magnets in close proximity to a plurality of stator coils that may be disposed on a stationary portion of the airflow generator.

Another embodiment provides a method of converting plenum air flow into electricity. The method may include disposing an airflow generator at one of an entry and an exit of a plenum for receiving air flowing through the plenum. In embodiments, a source of the air flowing in the plenum may be the air moving from a high atmospheric pressure area to a low atmospheric pressure area, the air flowing in a building exfiltration system, the air flowing in a passageway, the air flowing out of a passageway, a low velocity air flow source, and the like. The passageway may include one of a canal, a tunnel, an underpass, a chute, an aqueduct, and the like. Further, the method may include continuously venting the air flow to at least one of mitigate the airflow generator induced backpressure and augment air flow toward a rotatable portion of the airflow generator. In an embodiment, the continuous venting may be facilitated by a continuous venting port. Further, the continuous venting port may be disposed between the plenum and a blade assembly of the airflow generator.

The method may also include disposing a plurality of permanent magnets on the rotatable portion of the airflow generator that may be rotatable in response to the received air flow. Further, the method may include converting the air flow to electricity by the rotatable portion moving the plurality of permanent magnets in close proximity to a plurality of stator coils. The plurality of stator coils may be disposed on a stationary portion of the airflow generator. In an embodiment, the air may flow outward through the continuous venting port when the air flow being received may be less than 12,000 cubic feet per minute. In another embodiment, the air may flow inward through the continuous venting port when the air flow being received may be more than 13,000 cubic feet per minute.

Further, the method may include a venturi air flow restrictor disposed in the air flow proximal to a blade assembly of the airflow generator. A ventilator cowl may be adapted to transfer energy from ambient air currents to the airflow generator. In embodiments, the airflow generator comprises, a fixed drive shaft configured to facilitate rotation of the plurality of permanent magnets. Further, in an embodiment, the air flowing in the plenum may be one of a supply air, a re-circulated air, a return air, an exhaust air, an outdoor air, and the like.

Further, the plenum may be associated with a residential building, an industrial building, a commercial building, an institutional building, a cultural building, a recreational building, a rooftop, and the like. In an embodiment, the industrial building may be one of a factory, a warehouse, and the like. In another embodiment, the commercial building may be one of an office, a shop, a retail outlet, a wholesale outlet, and the like. Further, the institutional building may be one of a school, a college, a university, a hospital, a dispensary, a diagnostic centre, and the like. The recreational building may be one of a stadium, a gymnasium, a sports dome, a theatre, a club, and the like. Furthermore, the plenum may be associated with the rooftop in combination with solar panels. In an embodiment, the plenum may be deployed with one of a chimney, attic ventilation fan, whole house fan, window fan, air conditioner outdoor condenser unit, forced air heating/cooling system fan, clothes dryer vent output, and attic convection air flow through ridge vent.

Yet another embodiment provides a method of converting motion of a vehicle into electricity. The method may include receiving air flowing around the vehicle with an airflow generator disposed in an air flow path of the vehicle. The vehicle may be one of a bus, a refrigeration truck, a trailer, a cargo van, a recreational vehicle, a mobile home, a tractor, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

Still another embodiment provides a method of converting motion of a vehicle into electricity. The method may include receiving air flowing through the vehicle with an airflow generator disposed in an air flow path of the vehicle. The vehicle may be one of a bus, a refrigeration truck, a trailer, a cargo van, a recreational vehicle, a mobile home, a tractor, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

An alternate embodiment provides a method of converting motion of a ship into electricity. The method may include receiving air flowing around the ship with an airflow generator disposed in an air flow path of the vehicle. The ship may be one of a boat, a barge, a ferry, a watercraft, a trawler, a yacht, a marine vessel, a commercial vessel, a riverboat, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

Other embodiments provide a method of converting motion of a ship into electricity. The method may include receiving air flowing through the ship with an airflow generator disposed in an air flow path of the vehicle. The ship may be one of a boat, a barge, a ferry, a watercraft, a trawler, a yacht, a marine vessel, a commercial vessel, a riverboat, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

A method of converting motion of a plane into electricity is also provided. The method may include receiving air flowing around the plane with an airflow generator disposed in an air flow path of the vehicle. The plane may be one of an aircraft, a hovercraft, a transport plane, a military plane, a commercial plane, a jet, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

In yet another embodiment a method of converting motion of a plane into electricity is provided. The method may include receiving air flowing through the plane with an airflow generator disposed in an air flow path of the vehicle. The plane may be one of an aircraft, a hovercraft, a transport plane, a military plane, a commercial plane, a jet, and the like. The method may further include disposing a plurality of permanent magnets on a rotatable portion of the airflow generator. The rotatable portion may be rotatable in response to the received air flow. The plurality of permanent magnets may be disposed along a circumference of the rotating portion of the airflow generator. Further, the plurality of permanent magnets may be disposed at substantially equal distances from one another along the circumference. In addition, the method may include converting the air flow to electricity by the rotatable portion moving the plurality of permanent magnets in close proximity to a plurality of stator coils. The plurality of stator coils may be disposed on a stationary portion of the airflow generator.

In an embodiment a method of converting motion of a vehicle into electricity is provided. The method may include receiving air flowing around the vehicle with an airflow generator disposed in an air flow path of the vehicle. In an embodiment, the vehicle may be one of a bus, a refrigeration truck, a trailer, a cargo van, a recreational vehicle, a mobile home, a tractor, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In another embodiment, a method of converting motion of a vehicle into electricity is provided. The method may include receiving air flowing through the vehicle with an airflow generator disposed in an air flow path of the vehicle. In an embodiment, the vehicle may be one of a bus, a refrigeration truck, a trailer, a cargo van, a recreational vehicle, a mobile home, a tractor, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

A method of converting motion of a ship into electricity is provided by yet another embodiment. The method may include receiving air flowing around the ship with an airflow generator disposed in an air flow path of the vehicle. In an embodiment, the ship may be one of a boat, a barge, a ferry, a watercraft, a trawler, a yacht, a marine vessel, a commercial vessel, a riverboat, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In still another embodiment, methods and systems described herein provide a method of converting motion of a ship into electricity. The method may include receiving air flowing through the ship with an airflow generator disposed in an air flow path of the vehicle. In an embodiment, the ship may be one of a boat, a barge, a ferry, a watercraft, a trawler, a yacht, a marine vessel, a commercial vessel, a riverboat, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In yet another embodiment, methods and systems described herein provide a method of converting motion of a plane into electricity. The method may include receiving air flowing around the plane with an airflow generator disposed in an air flow path of the vehicle. In an embodiment, the plane may be one of n aircraft, a hovercraft, a transport plane, a military plane, a commercial plane, a jet, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In still another embodiment, methods and systems described herein provide a method of converting motion of a plane into electricity. The method may include receiving air flowing through the plane with an airflow generator disposed in an air flow path of the vehicle. In an embodiment, the plane may be one of an aircraft, a hovercraft, a transport plane, a military plane, a commercial plane, a jet, and the like. Further, the method may include disposing a plurality of permanent magnets on a rotatable portion of the airflow generator. A ventilator cowl may be configured to facilitate rotating the rotatable portion in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In yet another embodiment, methods and systems described herein provide a method of converting motion of a vehicle into electricity. The method may include receiving air flowing around the vehicle with an airflow generator disposed in an air flow path of the vehicle. In an embodiment, the airflow generator may be disposed proximal to an air outlet port of the vehicle. Further, the air flow may include air that may have passed through an air outlet port. In another embodiment, the airflow generator may be disposed proximal to an air inlet port of the vehicle. Further, the air flow may include air that may be flowing into the air inlet port. In addition, the airflow generator may include a fixed drive shaft that may be configured to facilitate rotation of the rotatable portion. In an embodiment, the vehicle may be one of a bus, a refrigeration truck, a trailer, a cargo van, a recreational vehicle, a mobile home, a tractor, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In another embodiment, methods and systems described herein provide a method of converting motion of a vehicle into electricity. The method may include receiving air flowing through the vehicle with an airflow generator disposed in an air flow path of the vehicle. In an embodiment, the airflow generator may be disposed proximal to an air outlet port of the vehicle. Further, the air flow may include air that may have passed through an air outlet port. In another embodiment, the airflow generator may be disposed proximal to an air inlet port of the vehicle. Further, the air flow may include air that may be flowing into the air inlet port. In addition, the airflow generator may include a fixed drive shaft that may be configured to facilitate rotation of the rotatable portion. In an embodiment, the vehicle may be one of a bus, a refrigeration truck, a trailer, a cargo van, a recreational vehicle, a mobile home, a tractor, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In still another embodiment, methods and systems described herein provide a method of converting motion of a ship into electricity. The method may include receiving air flowing around the ship with an airflow generator disposed in an air flow path of the ship. In an embodiment, the airflow generator may be disposed proximal to an air outlet port of the ship. Further, the air flow may include air that may have passed through an air outlet port. In another embodiment, the airflow generator may be disposed proximal to an air inlet port of the ship. Further, the air flow may include air that may be flowing into the air inlet port. In addition, the airflow generator may include a fixed drive shaft that may be configured to facilitate rotation of the rotatable portion. In an embodiment, the ship may be one of a boat, a barge, a ferry, a watercraft, a trawler, a yacht, a marine vessel, a commercial vessel, a riverboat, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In yet another embodiment, methods and systems described herein provide a method of converting motion of a ship into electricity. The method may include receiving air flowing through the ship with an airflow generator disposed in an air flow path of the ship. In an embodiment, the airflow generator may be disposed proximal to an air outlet port of the ship. Further, the air flow may include air that may have passed through an air outlet port. In another embodiment, the airflow generator may be disposed proximal to an air inlet port of the ship. Further, the air flow may include air that may be flowing into the air inlet port. In addition, the airflow generator may include a fixed drive shaft that may be configured to facilitate rotation of the rotatable portion. In an embodiment, the ship may be one of a boat, a barge, a ferry, a watercraft, a trawler, a yacht, a marine vessel, a commercial vessel, a riverboat, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In another embodiment, methods and systems described herein provide a method of converting motion of a plane into electricity. The method may include receiving air flowing around the plane with an airflow generator disposed in an air flow path of the plane. In an embodiment, the airflow generator may be disposed proximal to an air outlet port of the plane. Further, the air flow may include air that may have passed through an air outlet port. In another embodiment, the airflow generator may be disposed proximal to an air inlet port of the plane. Further, the air flow may include air that may be flowing into the air inlet port. In addition, the airflow generator may include a fixed drive shaft that may be configured to facilitate rotation of the rotatable portion. In an embodiment, the plane may be one of an aircraft, a hovercraft, a transport plane, a military plane, a commercial plane, a jet, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In still another embodiment, methods and systems described herein provide a method of converting motion of a plane into electricity. The method may include receiving air flowing through the plane with an airflow generator disposed in an air flow path of the plane. In an embodiment, the airflow generator may be disposed proximal to an air outlet port of the plane. Further, the air flow may include air that may have passed through an air outlet port. In another embodiment, the airflow generator may be disposed proximal to an air inlet port of the plane. Further, the air flow may include air that may be flowing into the air inlet port. In addition, the airflow generator may include a fixed drive shaft that may be configured to facilitate rotation of the rotatable portion. In an embodiment, the plane may be one of an aircraft, a hovercraft, a transport plane, a military plane, a commercial plane, a jet, and the like.

Further, the method may include continuously venting the air flow to at least one of mitigate the airflow generator induced backpressure and augment air flow toward a rotatable portion of the airflow generator. The continuous venting may be facilitated by a continuous venting port. The continuous venting port may be disposed between the machine and a blade assembly of the airflow generator. In an embodiment, the air may flow outward through the continuous venting port when the air flow generated by the machine may be less than 12,000 cubic feet per minute. In another embodiment, the air may flow inward through the continuous venting port when the air flow generated by the machine may be more than 13,000 cubic feet per minute.

Further, the method may include a venturi air flow restrictor that may be disposed in the air flow proximal to a blade assembly of the airflow generator. A ventilator cowl may be adapted to transfer energy from ambient air currents to the airflow generator. The ambient air currents may not require generation by the motion of the vehicle. The method may further include disposing a plurality of permanent magnets on the rotatable portion of the airflow generator that may be rotatable in response to the received air flow. The method may also include converting the air flow to electricity by the rotatable portion moving the plurality of permanent magnets in close proximity to a plurality of stator coils. The plurality of stator coils may be disposed on a stationary portion of the airflow generator.

In another embodiment, methods and systems described herein provide an airflow generator that may be configured to convert low velocity air flow into electricity. The airflow generator may also be configured to generate at least 250 W of electrical energy from 12,000 or fewer cubic feet per minute of air flow. In an embodiment, the low velocity air may be selected from at least one of a ventilation system exhaust, air intake ventilation, a make-up air source, an air exchange source, an air conditioner outlet, a paint booth ventilation system, a natural wind current, convection current, a fan, and the like.

An airflow generator also provides an airflow generator for converting air flow into electricity by converting airflow into torque applied to a plurality of rotating turbine blades. The airflow generator may be configured to generate at least 1000 W of electrical energy from as little as 35,000 cubic feet per minute of air flow.

In another embodiment, methods and systems described herein provide a self-starting airflow generator system. The airflow generator system may include at least two airflow generators that may be electrically interconnected to provide electrical energy. The electrical energy may be generated from air flowing through at least one of the at least two airflow generators for energizing a starter motor of at least one of the at least two airflow generators.

In yet another embodiment, methods and systems described herein provide generation of direct current electricity from an airflow generator without requiring matching components in an electricity generating path of the airflow generator.

In another embodiment, methods and systems described herein provide an airflow generator that may be configured to convert air flow into electricity. The airflow generator may include a stationary drive shaft that may be configured to facilitate rotation of a turbine blade assembly. The turbine blade assembly may include a plurality of permanent magnets disposed along a circular circumference. The airflow generator may also include a plurality of stator coils disposed on a stationary surface. The plurality of stator coils may be disposed in close proximity to the plurality of permanent magnets. Further, the plurality of stator coils may be disposed on a co-planer axis spaced outwardly from the stationary axis shaft. In an embodiment, a rotating motion of the plurality of permanent magnets may form a plane that may be substantially parallel to the plurality of stator coils.

These and other systems, methods, objects, features, and advantages will be apparent to those skilled in the art from the following detailed description of the preferred embodiment and the drawings. All documents mentioned herein are hereby incorporated in their entirety by reference.

BRIEF DESCRIPTION OF THE FIGURES

An airflow generator and the following detailed description of certain embodiments thereof may be understood by reference to the following figures.

DETAILED DESCRIPTION OF THE PREFERRED EMBODIMENT(S)

Detailed embodiments are disclosed herein; however, it is to be understood that the disclosed embodiments are merely, which may be embodied in various forms. Therefore, specific structural and functional details disclosed herein are not to be interpreted as limiting, but merely as a basis for the claims and as a representative basis for teaching one skilled in the art to variously employ an airflow generator in virtually any appropriately detailed structure. Further, the terms and phrases used herein are not intended to be limiting, but rather to provide an understandable description.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and/or mechanically.

An airflow generator may include an airflow generator for generating electricity from renewable sources, such as wind, manmade air supply streams, and waste streams, such as exhausts. The electricity generation may involve converting an air flow into electricity through electro-magnetic induction. The airflow generator may include a plurality of permanent magnets that may be rotatable around fixed stator coils. The generated electricity may be used to supply power to commonly utilized energy devices in commercial and industrial buildings, such as space heaters, auxiliary equipment, lighting, water heaters, motors and controls, air conditioners, and the like.

Figure 1:
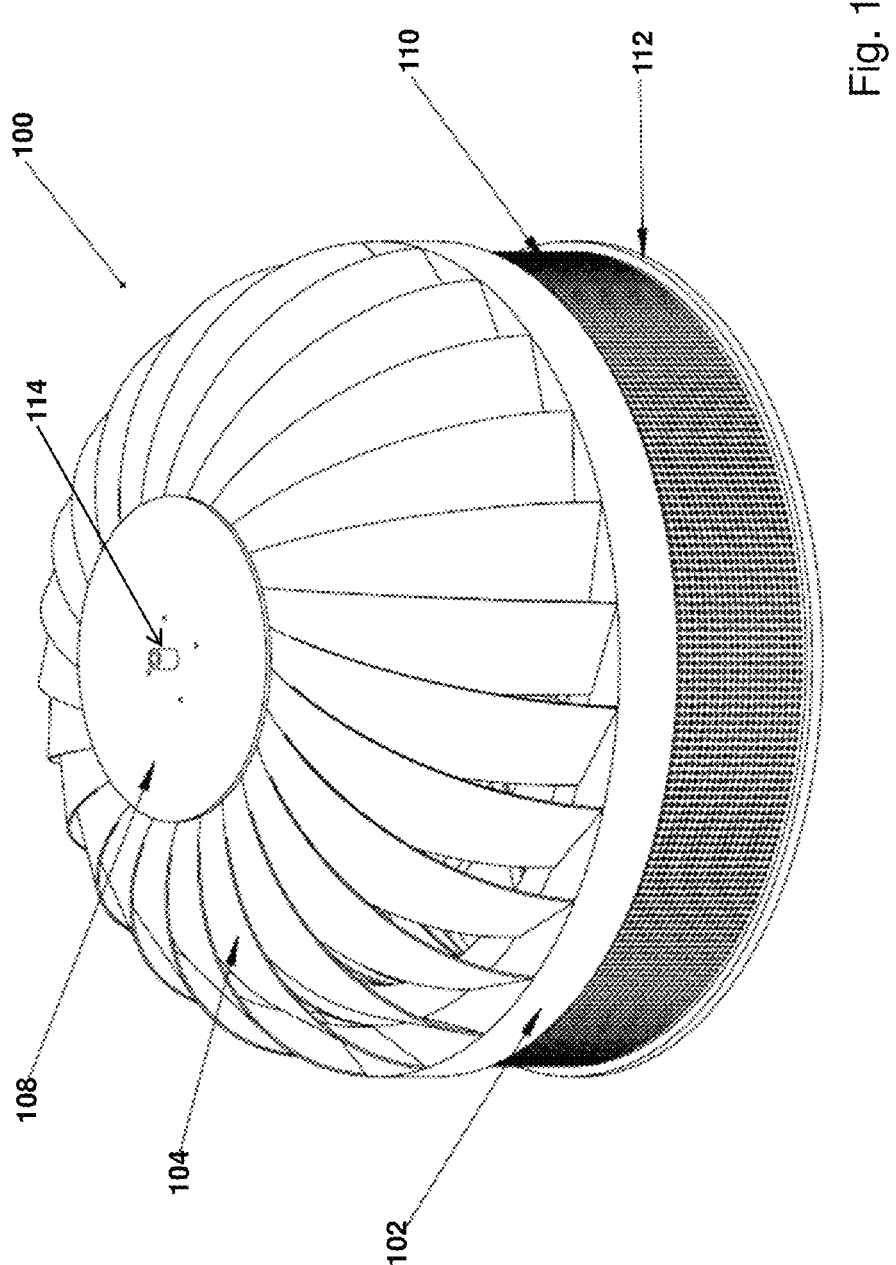
FIG. 1 depicts a perspective view of an airflow generator described herein.

Referring now to the airflow generator in more detail, FIG. 1 depicts a perspective view of an airflow generator 100 that is described herein. The airflow generator 100 may operate over a wide range of air flow velocities. For example, the airflow generator 100 may operate in naturally occurring winds over a wide range of velocities and in non-natural air flow over a wide range of velocities while still producing significant energy output. The airflow generator 100 may include a ventilator cowl base 102 which may be mechanically connected to a cowl bonnet/blade assembly that may include a plurality of cowl blades 104, a blade top plate 108, a venting port 110, and a bottom base 112. Additional details, such as a stator and magnet turbine blade system will be described in later parts of this specification.

In an embodiment, the plurality of cowl blades 104 may reduce noise caused by air flowing past the plurality of turbine blades that are disposed below the ventilator cowl and are described further in FIG. 3. This noise may be called cavitation. The plurality of cowl blades 104 may be attached to the blade top plate 108. In an embodiment, the plurality of cowl blades 104 may be spherical for enhancing energy transfer from the air flow to the airflow generator 100. In another embodiment, the plurality of cowl blades 104 may be flat in shape. In yet another embodiment, the plurality of cowl blades 104 may include forty-five blades, however; it will be evident to a person skilled in the art the number of blades may be three, four, and the like. Further, the plurality of cowl blades 104 may be spaced around a shaft (not shown). The blade assembly may facilitate capturing of ambient air flowing past the airflow generator 100.

The venting port 110 may facilitate positive displacement of high pressure air that may flow through the airflow generator 100 from an air flow source below the bottom base 112. At startup of an air flow source, such as an air conditioner fan, air must be allowed to freely pass out of the air outlet to avoid producing excessive back pressure or static pressure. In an example, when an air conditioner fan goes from stopped to full rotational velocity in as little as one second or less, the fan may cause a tremendous increase in air pressure directly below the airflow generator 100. The venting port 110 may enable release of such high pressure air flowing through the airflow generator 100 from the fan below the bottom base 112. Further, the venting port 110 may allow the air to flow in during a steady state.

Figure 2:
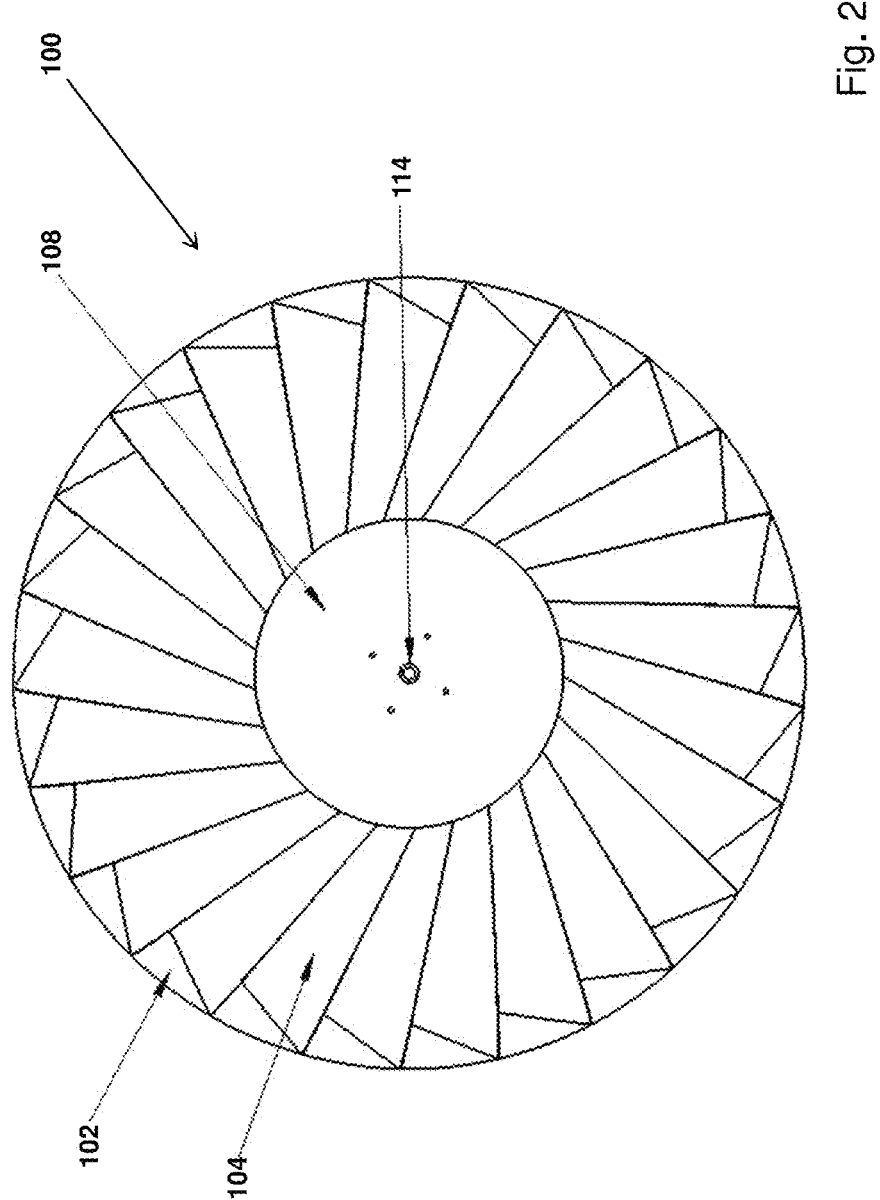
FIG. 2 depicts a top plan view of the airflow generator, showing an arrangement of a plurality of ventilator cowl blades.

Referring to FIG. 2, a top plan view of the airflow generator 100 showing an arrangement of the plurality of cowl blades 104 is depicted, in accordance with the embodiment of an airflow generator. The ventilator cowl may include twenty-five blades. These twenty-five blades may be evenly spaced around the shaft 114 that may facilitate rotation of the ventilator cowl. Further, the plurality of cowl blades 104 may be optimized and may be designed with aerodynamic profiles so as to optimize energy transfer from the air flow to a rotatable portion of the airflow generator 100. Suitable blades may include commercially available blades, which may be commonly used in conventional ventilators; the blades may be altered for an optimized aerodynamic blade profile, which may incorporate a tapering, thickening, thinning, and spacing to reduce the impact of wind shear.

In an embodiment, the plurality of cowl blades 104 may be presented at an angle to direction of anticipated air flow to facilitate air flow energy extraction. For example, the plurality of cowl blades 104 may be presented at an angle of thirty degrees to direction of anticipated air flow. It should be understood that blade design and air flow extraction angle may be varied to accommodate a variety of ventilator sizes and air flow speed operating regimes.

Figure 2A:
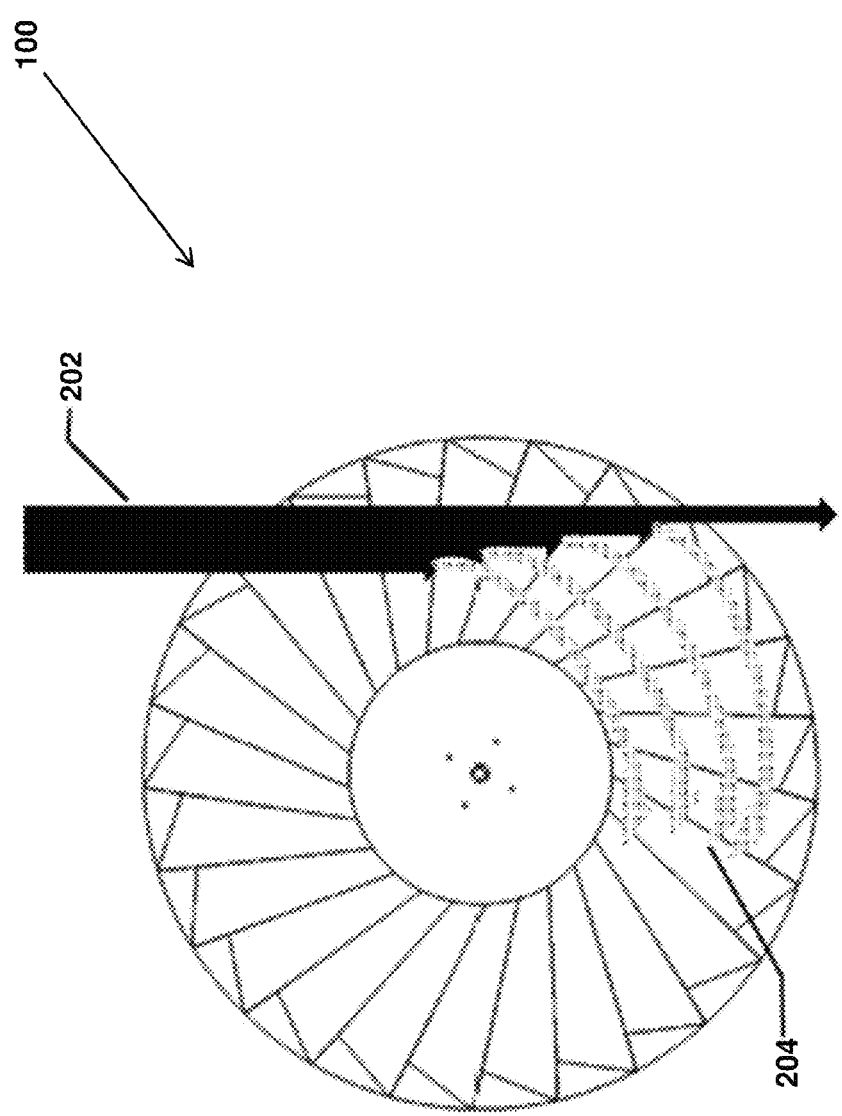
FIG. 2A depicts a top view of the airflow generator showing interaction of external air with the ventilator cowl to facilitate rotation of a rotatable portion of the airflow generator.

Referring now to FIG. 2A, a top view of the airflow generator 100 showing interaction of external air with the ventilator cowl to facilitate rotation of a rotatable portion of the airflow generator 100 is depicted. The external air source such as wind may be captured by the plurality of cowl blades 104 and may be converted into rotation of a portion of the airflow generator 100 that may produce electrical energy. In this embodiment, wind 202 may flow against the plurality of cowl blades 104 and a portion of the wind 202 may be captured by the plurality of cowl blades 104. The captured portion of the wind 204 may cause a rotational force to be applied to the ventilator cowl. Because of the circular shape of the ventilator cowl, wind blowing from any direction can impart a rotational force. In this way external, ambient air flows such as wind, thermal currents, and the like; may be a source of electrical power generation. This air flow may be combined with other man-made sources of air that may be presented to an inlet portion of the airflow generator (e.g. the underside of the generator), to further enhance the airflow generator performance.

Figure 3:
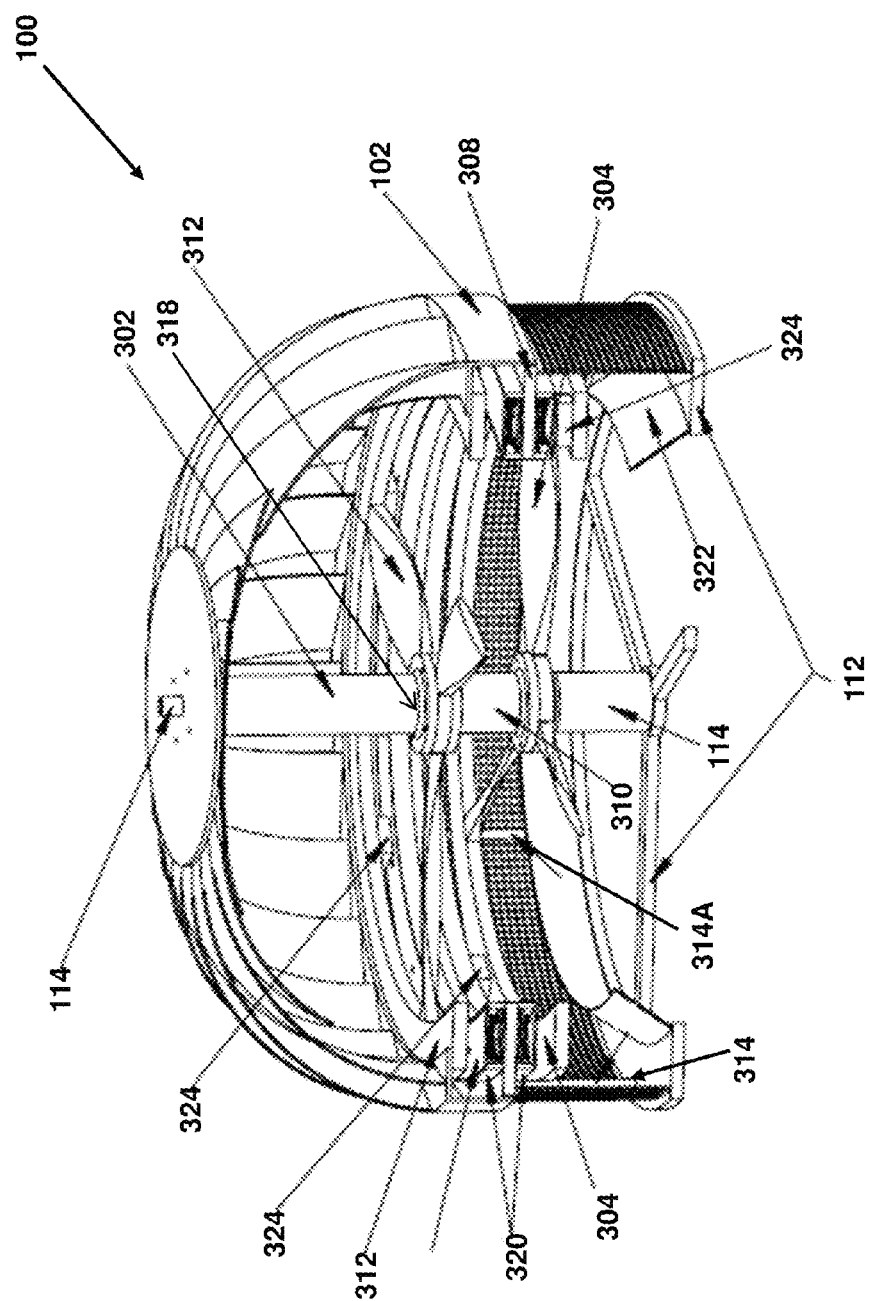
FIG. 3 depicts a perspective cross-sectional view illustrating components of the airflow generator.

Referring to FIG. 3, a perspective cross-sectional view illustrating components of the airflow generator 100 is depicted. As mentioned herein, the airflow generator 100 may include a ventilator cowl that may be connected with a joiner coupler 302 to at least an upper turbine blade assembly 312. The cowl and upper turbine blade assembly 312 may rotate together via the joiner coupler 302 that may rotate around the shaft 114. In an embodiment, the shaft 114 may be a non-rotary shaft with no axis of rotation. Further, the shaft 114 may support a lower turbine blade assembly 304 that may be aerodynamically angled to provide increased lift to in-bound air coming from below the airflow generator 100 to enhance velocity. The present embodiment may further include the bottom base 112 and a top base 308. The shaft 114 may be joined with a hub joiner 310 to the top base 308 via the upper turbine blade assembly 312.

Further, a brace assembly including base frame supports 314 may be used to facilitate rotation of the lower turbine blade assembly 304 relative to the bottom base 112. In an embodiment, the top base 308 and the lower turbine blade assembly 304 may be rotatably joined with the hub joiner 310. The hub joiner 310 may include sealed bearings 318, such as sealed ball bearings and sealed or non-sealed thrust axial needle bearings, and the like. Further, the lower cowl portion 102 may protects one or more stator coil housings 320 by guarding it from harsh environmental impacts. The stator coil housing 320 may be formed from a non-magnetic material such as a plastic material. Further, the ventilator cowl may facilitate electrical, fire, and shock safety benefits.

In an embodiment, the components of the airflow generator 100 including the ventilator cowl base 102, the plurality of cowl blades 104, the top plate 108, the venting port 110, the bottom base 112, the upper turbine blade assembly 312, the lower turbine blade assembly 304, and the base frame supports 314, may be made from a variety of different materials, including polymers including nylon, reinforced polymers, or a combination thereof, metal, such as aluminum, steel, and the like.

In the illustrated embodiment of FIG. 3, the airflow generator 100 may include a venturi style air flow restrictor 322. The air flow restrictor may apply constriction to the air flow by reducing the available air flow path volume; this may result in an increase in air velocity within the airflow generator 100. Further, when the air leaves the constriction and heads toward the lower turbine blade assembly 304, a lower pressure ambient makeup airflow that may be sourced through the venting port 110 may pass by the lower turbine blade assembly 304 and the upper turbine blade assembly 312 thereby may produce a pressure differential and hence a lift force may be applied to the turbine blade assemblies 304 and 312 that may facilitate maintaining safe clearance between the stator coil housing 320 and a plurality of magnets 324. In an embodiment, the plurality of magnets 324 may be mounted at the bottom base 112. It should be understood that the number of blades and magnets may be varied independently.

In an embodiment, the airflow generator 100 may be configured to convert low velocity air flow into electricity. The airflow generator may be configured to generate in the range of 250 W to 1000 W of electrical energy from at least 12,000 or greater cubic feet per minute of air flow. Further, the low velocity air may be selected from at least one of a ventilation system exhaust, air intake ventilation, a make-up air source, an air exchange source, an air conditioner outlet, a paint booth ventilation system, a natural wind current, convection current, a fan, and the like. In another embodiment, the airflow generator 100 may be configured to convert airflow into torque applied to the plurality of blades 104.

Figure 4:
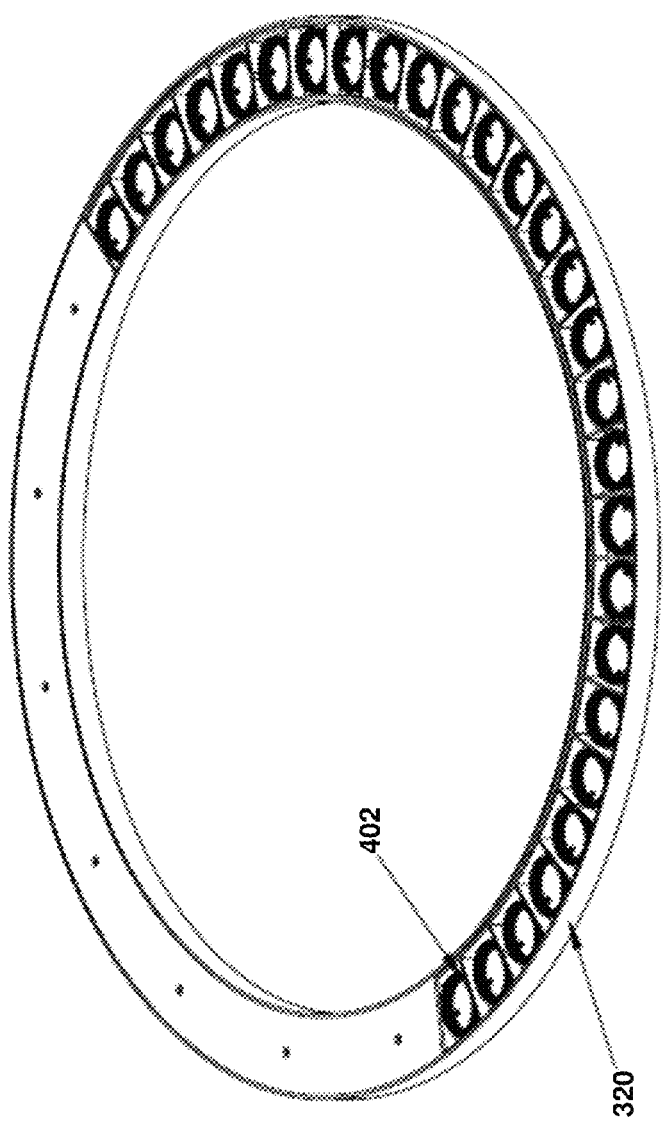
FIG. 4 depicts a perspective schematic drawing of a stator coil assembly of the airflow generator.

Referring to FIG. 4, a perspective schematic drawing of a stator coil assembly 402 of the airflow generator 100 is depicted. The stator coil assembly 402 may be arranged and assembled in the stator coil housing 320. The stator coil assembly 402 may include a plurality of stator coils. In the present embodiment, the stator coil assembly 402 may include 48 stator coils. The plurality of stator coils may be formed from a conductive wire, such as copper or aluminum wire. For example, the plurality of stator coils may be made from a double-loop copper wire of gauges in a range of about ten to twenty eight, which may be disposed inside the stator coil housing 320. The copper wire gauge may be varied depending on the turbine size and power output design requirements.

It will be evident to a person skilled in the art that the number of coils may be changed for increasing or decreasing power generated by the airflow generator 100. Further, placement of the plurality of magnets 324 being independent of the respective stator coils may facilitate smooth electrical generation performance in high air flow speeds by preventing damage to the plurality of stator coils.

Figure 5:
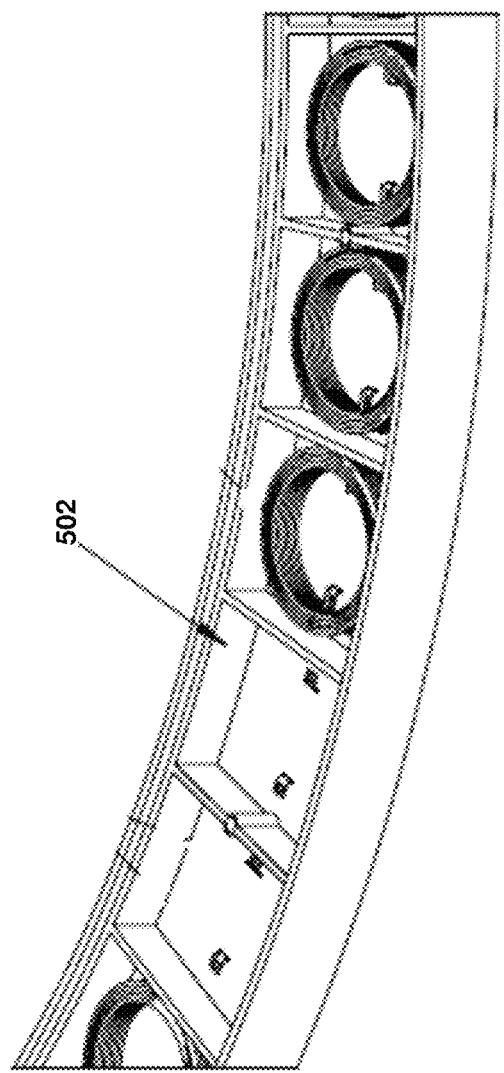
FIG. 5 depicts an enlarged top perspective section view of the stator coil assembly.

Now referring to FIG. 5, an enlarged top perspective view of the stator coil housing 320, illustrating a detailed view of the connectors to a printed circuit board or main bus line, in accordance with an embodiment of an airflow generator. The stator coil housing 320 may include an individual pocket 502 for each stator coil of the plurality of stator coils. In an embodiment, the individual pocket 502 may be similar in shape to a stator coil. The plurality of stator coils may be shaped in a round form to avoid vibrations. Vibrations may cause a chattering sound which may be avoided by using a round shape to restrain the stator coils from movement induced by the permanent magnets passing by.

Figure 6:
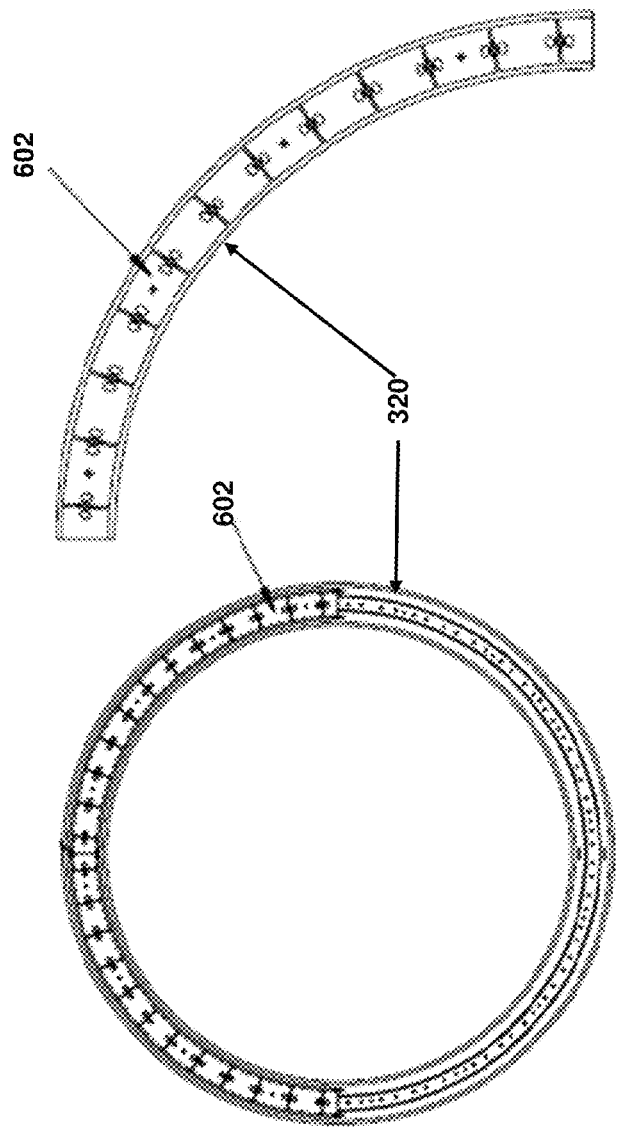
FIG. 6 depicts a plan view of the stator coil assembly.

Further, FIG. 6 depicts a plan view of the stator coil assembly 402. The stator coil assembly 402 may be connected to a coil circuit 602. In an embodiment, the coil circuit 602 may be a printed circuit. As mentioned herein, the stator coil assembly 402 may include a plurality of conductive stator coils. In an embodiment, the stator coil assembly 402 may include a plurality of stator coils that may be formed by separate stator coils that may be connected in phase with each other. In another embodiment, the separate stator coils may be connected in groups to form the plurality of stator coils.

In an example, if twelve stator coils are energized simultaneously, maximum power output of the airflow generator 100 may be about 540 Watts at 400 Rotations Per Minute (RPM). Each stator coil may be used for producing a power output of about 45 Watts. Conventionally, airflow generators may require complex Direct Current (DC) wiring with many wires to route, terminate and secure. When such a wiring is energized a DC voltage may develop that may be lethal. Also, conventional airflow generators may require specific expertise to match and integrate components. In embodiments of an airflow generator, a simpler design for achieving higher performance may be provided.

In embodiments, the airflow generator 100 may be used for generating DC electricity without requiring matching components in an electricity generating path of the airflow generator 100.

In an embodiment, the airflow generator 100 may use a micro AC inverter (not shown). The micro AC inverter may be connected to the coil circuit 602 of the airflow generator 100. Further, the micro AC inverter may facilitate in receiving and conditioning electricity generated from each stator coil. The micro AC inverter may allow little or no electrical mismatch losses and may facilitate ensuring that a single-point-of-failure may not disable the airflow generator 100. The micro AC inverter may be sealed and therefore may not require a cooling vent. This may assure that components of the micro AC inverter may stay clean and dry inside. In an embodiment, the micro AC inverter may facilitate use of locking connectors to carry the AC and ground. From a safety perspective, the micro AC inverter may not be energized until connected to utility grid, electrical load, or electrical energy storage facility such as a non-grid connected battery, and the like. This arrangement may be optional and may be advantageously used for an airflow generator up to approximately 10 kilowatts.

Figure 7:
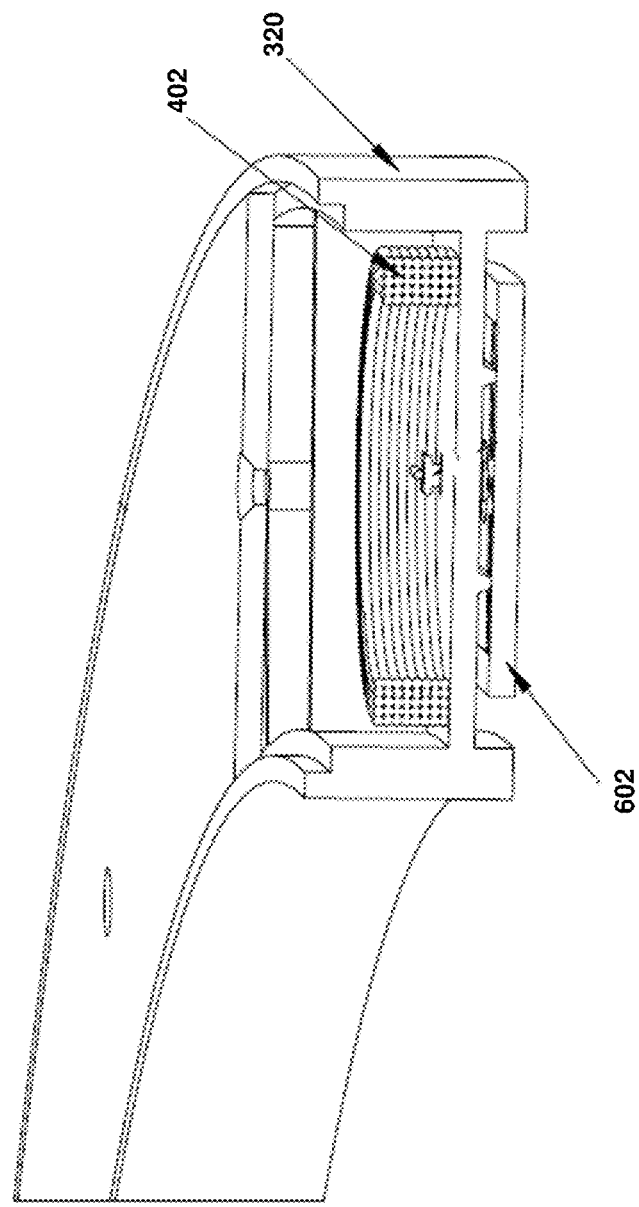
FIG. 7 depicts a perspective cross-sectional view of the stator coil assembly.

Now referring to FIG. 7, a perspective cross-sectional view of the stator coil assembly 402 is depicted. The stator coil assembly 402 may be mounted on the coil circuit 602. The stator coil assembly 402 and the coil circuit 602 may be mounted to the stator coil housing 320. Further, the stator coils of the stator coil assembly 402 may be electrically connected to one another by the coil circuit 602.

As would be understood that when two magnets are used, the plurality of stator coils covering more than half of the turbine blade base circumference may need to be utilized to produce a continuous electrical signal so that a magnet is continuously in close proximity to a stator coil. If four magnets are used, the plurality of stator coils may cover approximately one quarter of the turbine base circumference to produce a nearly continuous electrical signal.

Figure 8:
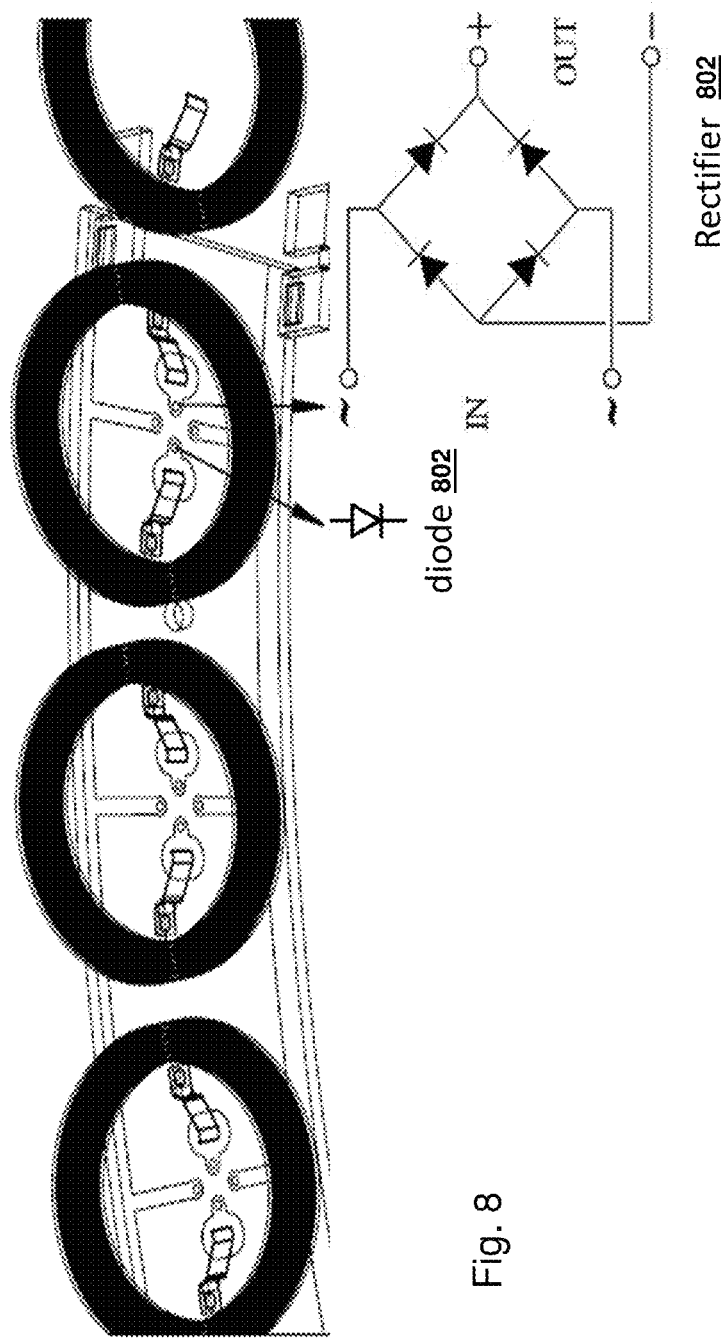
FIGS. 8 & 8A depict another perspective cross-sectional view of the stator coil assembly.
Figure 8A:
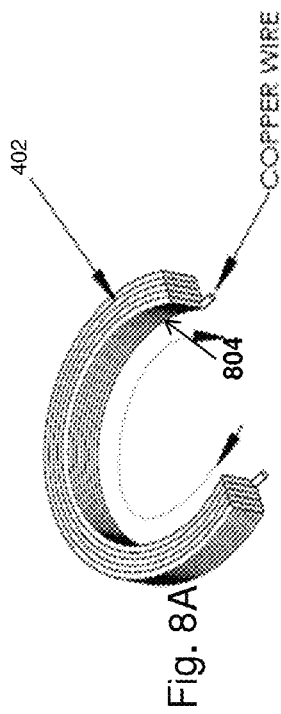

Referring to FIGS. 8 & 8A, another perspective cross-sectional view of the stator coil assembly 402 is depicted. In an embodiment, a diode/rectifier 802 may be included in the coil circuit 602. The diode/rectifier 802 may be used on each stator coil of the plurality of stator coils to locally generate Direct Current (DC) signal from each stator coil. In an embodiment, a DC voltage may be applied to the plurality of stator coils to create impulse power to assist the initial motion of the plurality of cowl blades 104 to overcome static friction. The DC voltage may be applied automatically or with a manual push button.

In an example, each group of stator coils may be terminated at the diode/rectifier 802. Single coils may be joined with other coils at a positive and a negative output terminal of the diode/rectifier 802. The plurality of stator coils may then be physically overlapped for higher electrical generation efficiency. Once the various loops are formed, they may then be positioned over the coil stator housing 320. It will be evident to a person skilled in the art that the diode/rectifier 802 may be used for each stator coil, for pairs of stator coils or for a plurality of stator coils.

In another embodiment, some of the stator coils may be connected separately at given regions of the stator coil housing 320. These stator coils may be connected without a diode/rectifier. If the diode/rectifier is not used then alternating current (AC) may be produced. This may be rectified at a later state if needed. The electrical output may then be converted to a standard 12 volt DC to charge a small 12 volt DC car battery or a 120 volt AC standard output voltage for direct use. The plurality of stator coils may be assembled in sections to produce a continuous electrical signal output and/or may cover the ventilator cowl blade base circumference for even higher energy efficiency. In embodiments, discrete diodes may be used in lieu of a bridge rectifier for reasons such as reduced cost, lower resistance, and the like.

FIG. 8A depicts an alternative arrangement where the stator coil assembly 402 may be formed in two separate coils and connected in series or parallel phases. When the plurality of magnets 324 may pass in close proximity of any of the plurality of stator coils, a voltage may be induced. As mentioned herein, the stator coils may be formed from a conductive wire. For example, copper, aluminum, or other good conductive coil stock may be used. The conductive wires may be used in a manner to improve the electric generation efficiency, which will be more fully described below.

The stator coil wire may be arranged to form a first loop with the coil wire crossing back over itself at a cross-over point or region to form a second loop. The copper wire may then be crossed back to form a third loop and then back again to form a forth loop, as shown by arrow 804. This process may be repeated to form multiple loops such as hundreds of loops, to thereby form a coil. This may be repeated until the number of turns in the wire may be sufficient, for example, hundreds of loops depending on the wire gauge and power generation needed. Alternatively, the stator wire may be formed in a substantially flat spiral. One or more of these coils may be used to generate electricity from the moving permanent magnets.

In embodiments, the plurality of stator coils may be layered in structure. Further, the plurality of stator coils may be spiral in shape. The stator coil assembly 402 may be placed apart from the shaft 114 and in proximity to the plurality of magnets 324. Further, the stator coil assembly 402 may be disposed at the ventilator cowl base 102 such that rotation of the plurality of magnets 324 may induce current flow in the stator coil assembly 402.

Figure 9A:
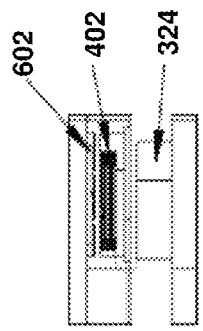
FIGS. 9 & 9A depict an enlarged perspective cross-sectional view of the airflow generator.
Figure 9:
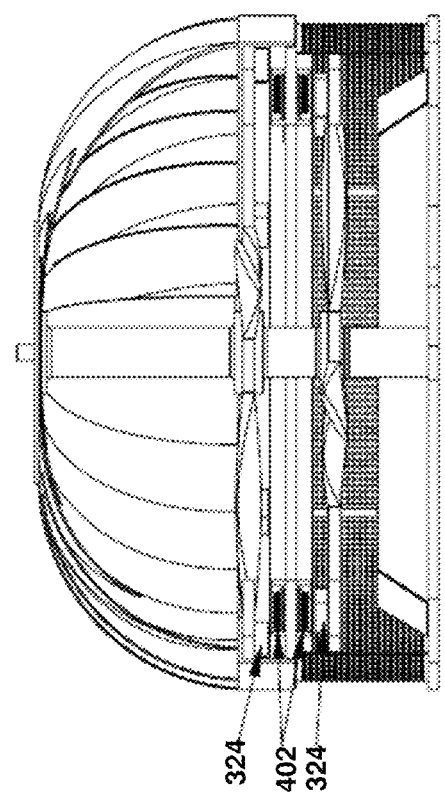

Now referring to FIGS. 9 & 9A, an enlarged perspective cross-sectional view of the airflow generator 100 is depicted. The stator coil assembly 402 and the plurality of magnets 324 may be disposed on a co-planer axis spaced outwardly from the shaft 114 having an axis of rotation. The stator coil assembly 402 may be placed such that the plurality of stator coils may face the plurality of magnets 324. Further, as mentioned herein, the stator coil assembly 402 may be placed close to the plurality of magnets 324 such that movement of the plurality of magnets 324 may induce current flow in the plurality of coils. It should be understood that the magnets of the plurality of magnets 324 are shown only two times in FIG. 9; however the number of magnets of the plurality of magnets 324 may vary such as two, four, six, eight, and the like.

Further, the plurality of stator coils may be arranged around and spaced a radial distance apart from the shaft 114 and may be arranged near the plurality of magnets 324. Accordingly, when the plurality of magnets 324 may be rotated, a current flow may be induced in the plurality of stator coils of the stator coil assembly 402. As mentioned herein, the stator coil assembly 402 may be coupled to the coil circuit 602 that may deliver electricity from the airflow generator 100 to a desired application. In an embodiment, the plurality of magnets 324 may be permanent magnets.

In an embodiment of an airflow generator, the airflow generator 100 may be provided with the plurality of stator coils at the ventilator cowl base 102 of the plurality of cowl blades 104. Thereby, the airflow generator 100 may take advantage of natural vertical loads of high air flow with no impact on the stator coil assembly 402 due to deflection along the radial axis of rotation in high air flows. Further, the plurality of magnets 324 and the plurality of stator coils may be spaced around the base or circumference of the airflow generator 100. The stator coil assembly 402 may be placed away from the shaft 114 to maximize energy extraction. In an embodiment, the airflow generator 100 may facilitate current flow with a lower shaft speed. Further, induced current may be generated with smaller blade tip.

In the illustrated embodiment of FIG. 9, the plurality of magnets 324 may be arranged so that their N and S poles may be parallel to the shaft 114. This may enable the N and S poles to rotate in substantially parallel planes and in a path that may be the same axial radial distance from the shaft 21. Further, the stator coil assembly 402 may be arranged in parallel planes to facilitate additive current flow from the rotation of the plurality of magnets 324. In embodiments, the parallel planes may include a horizontal plane and a vertical plane. Further, the number of the plurality of magnets 324 and their deployment may employ other methods so as to optimize the energy extraction, and magnetic flux stabilization at high Revolutions per Minute (RPM). Further, the plurality of magnets 324 may be attached to a steel substrate to ensure that induced flux of the plurality of magnets 324 may be maintained at high RPM.

Figure 10:
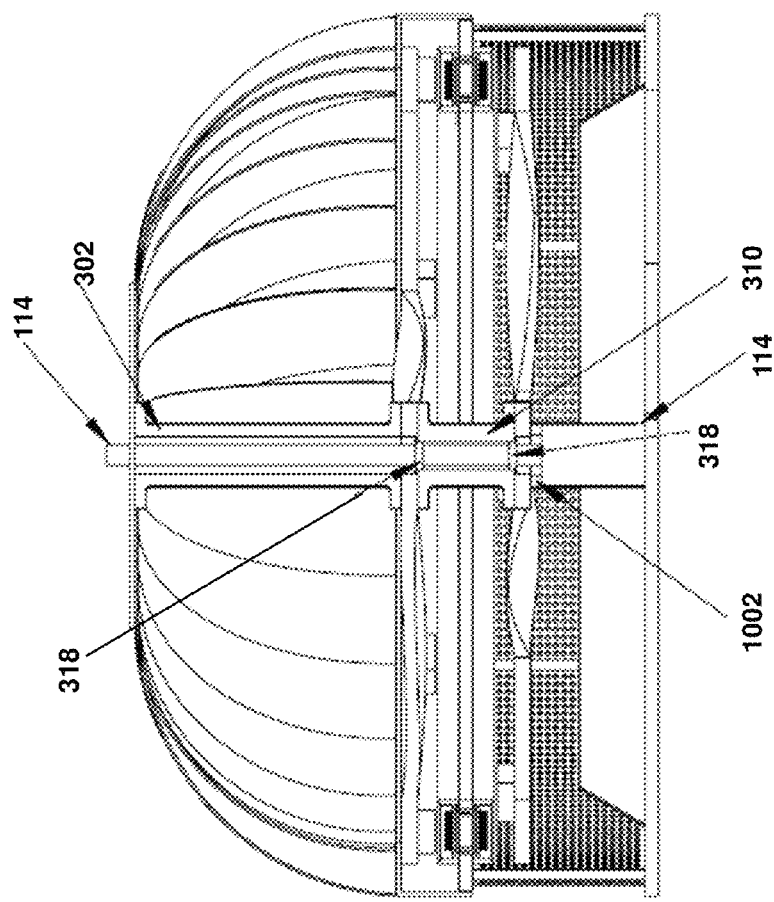
FIG. 10 depicts a cross-sectional view of the airflow generator.

Now referring to FIG. 10, a cross-sectional view of the airflow generator 100 is depicted. As described herein, the airflow generator 100 may include the shaft 114 that may be stationary and may provide support to the lower turbine blade assembly 304. In an embodiment, the shaft 114 may be provided with the joiner coupler 302 and the hub joiner 310. The hub joiner 310 may be coupled to the shaft 114 by means of the sealed bearings 318. The sealed bearings 318 may reduce rotational friction and may support radial and axial motion. Further, the upper turbine blade assembly 312 and the lower turbine blade assembly 304 may be coupled to the hub joiner 310. The hub joiner 310 may facilitate rotation of magnetic field sources such as the plurality of magnets 324. Further, the hub joiner 310 and the shaft 114 holding the plurality of stator coils may be in a co-planar axis. Further, the airflow generator 100 may include a support beam shaft coupler 1002. More detailed view of the shaft 114 and the blade assemblies 304 and 312 is provided in FIG. 11.

Figure 11:
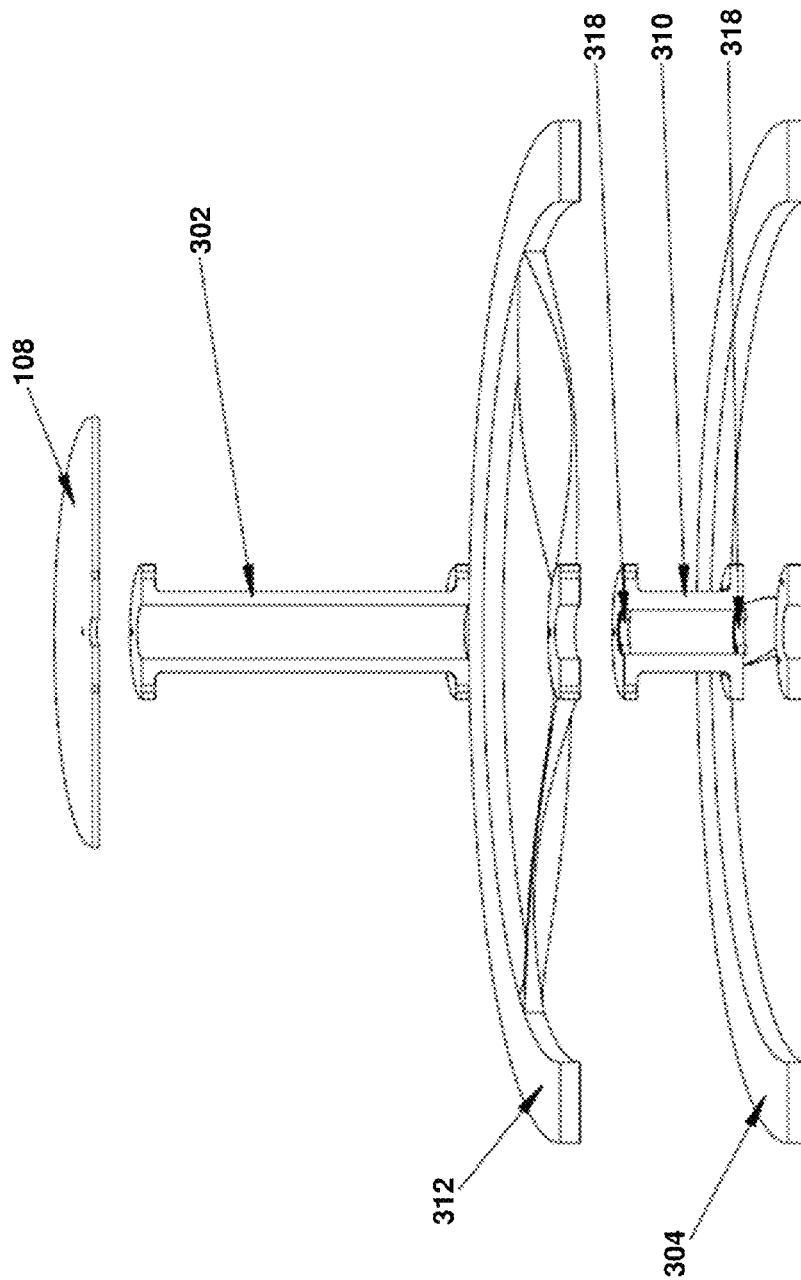
FIG. 11 depicts a cut away exploded view of the rotational and non-rotational elements of the airflow generator.

Referring to FIG. 11, a cut away exploded view of the rotational and non-rotational elements of the airflow generator 100 is depicted. As described earlier, the airflow generator 100 may include the blade top plate 108 coupled to the joiner coupler 302. The joiner coupler 302 may be disposed on the shaft 114. Further, the hub joiner 310 may be disposed on the shaft 114 by means of the sealed bearings 318. The hub joiner 310 may support the upper and lower blade turbine assemblies 304 and 312.

Figure 12:
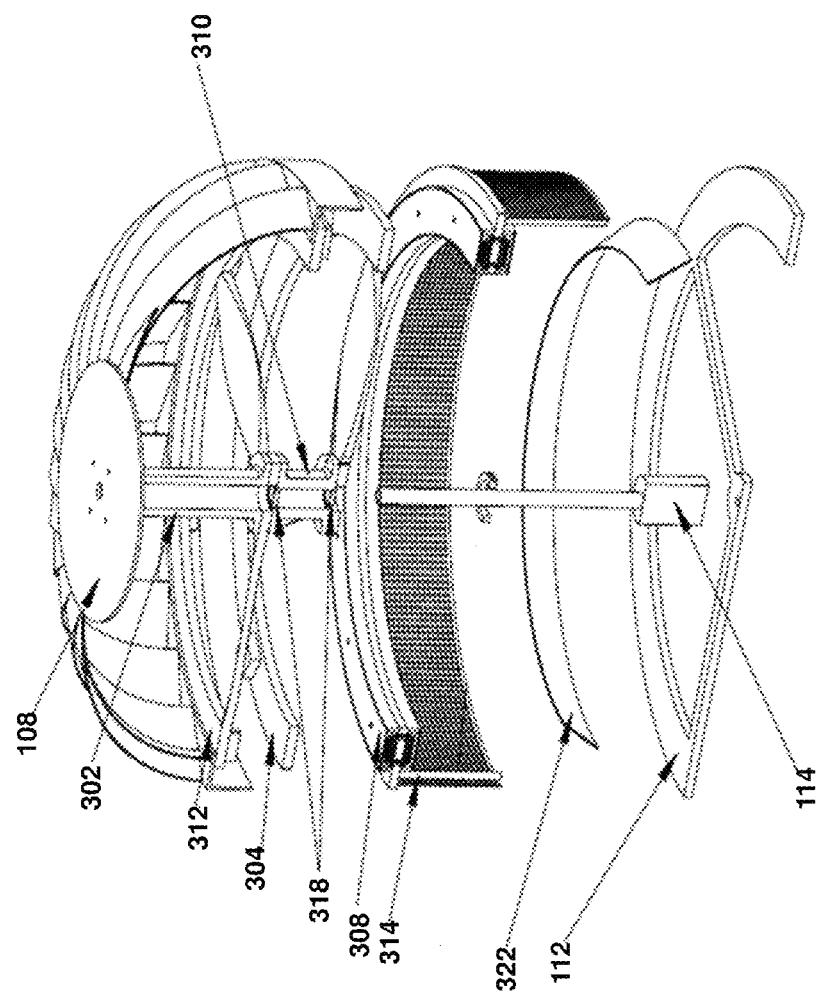
FIG. 12 depicts an exploded view of the airflow generator according to a preferred embodiment.
Figure 13B:
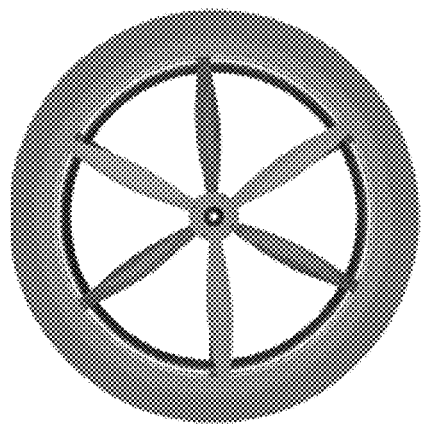
FIGS. 13A through 13D depict various embodiments of the airflow generator.
Figure 13D:
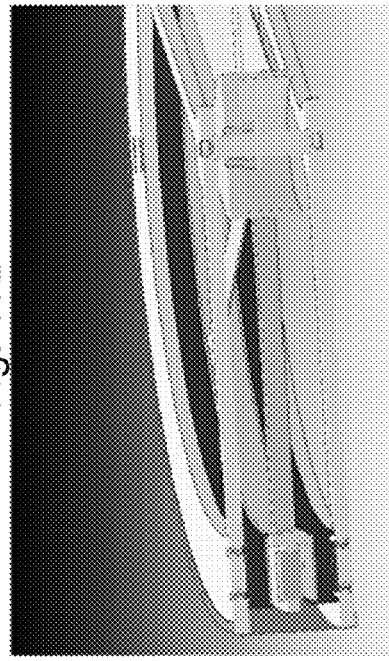
Figure 13A:
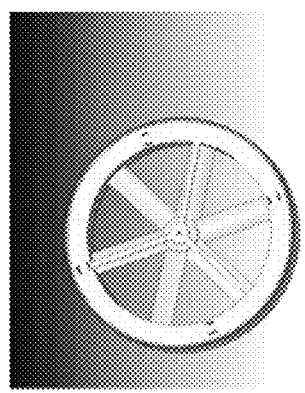
Figure 13C:
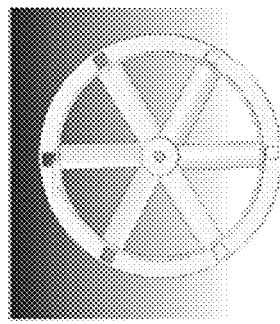

Referring to FIG. 12, a dual stator and coil version of the airflow generator 100 is depicted. In an embodiment, the stator coil assembly 402 may include dual rows of the plurality of stator coils. The dual rows may facilitate in increase in electricity output generation. In embodiments, the dual rows of the plurality of stator coils may share a common axis. The dual rows may provide a capability to operate at low and zero speeds, thereby may maintain high frequencies. In another embodiment, the rows may be varied for further increase in energy output. For example, a third or a fourth row of the plurality of stator coils may be added to the stator coil assembly 402.

Referring to FIGS. 13A-13D, various embodiments of a turbine blade assembly of the airflow generator 100 are depicted. In an embodiment, the airflow generator 100 may have a non-ventilator or a flat profile. Such airflow generators may include one-piece molded blades that may be molded over magnets which may be magnetized after the molding process. The magnets may thereby significantly reduce the handling complexity during production of the airflow generator 100. Representative dimensions may include radial arms ranging from less than 18 inches to as much as 36 inches or more with magnets generally in the range of 0.25-3.0 inches long by approximately 0.50-2.0 inches thick. Further, as may be seen in the various depictions of FIGS. 19A through 19C, the blade design and shape may be optimized for air flow and size factors.

It should also be understood that not only the blade sizes and shapes be optimized for air flow and size factors, the plurality of magnets 324 and the plurality of stator coils and shapes may also be optimized. In an embodiment, for configurations of the airflow generator 100 with larger radius arms, size of the plurality of magnets 324 as well as number of magnets may be increased. In another embodiment, for configurations of the airflow generator 100 with small blades such as a 4" vent stack, the plurality of magnets 324 may be made small and/or fewer of the plurality of magnets 324 may be used.

Although the figures depicted and described herein refer to the plurality of magnets 324 and the plurality of stator coils being oriented over or under one another, a side-by-side orientation of the plurality of magnets 324 and the plurality of coils may result in performance and output capabilities similar to those depicted herein. Therefore, when the plurality of magnets 324 and the plurality of stator coils arrangements, electrical current generation, and the like, are described herein, it can be understood that side-by-side magnet-coil arrangements are contemplated by the inventors as alternative embodiments. It may be possible to combine over/under and side-by-side configurations to further enhance the inventive airflow generator's electrical power generation capabilities.

In embodiments, the airflow generator 100 may include a structural framework (not shown). The structural framework may facilitate attachment of the shaft 114 and the stator coil assembly 402 with an air duct. Further, the airflow generator 100 may be connected to an external motor such as for the purposes of facilitating starting rotation of the ventilator cowl blade assembly 104, or any rotatable portion of the airflow generator in low velocity air flow conditions.

Further, the airflow generator 100 may operate under various environments. In an example, the airflow generator 100 may operate in low velocity air flow conditions received from naturally occurring winds. Further, the low velocity air may include air flows from non-natural sources, such as an outlet of a heating supply, an outlet of an air conditioning supply, an exhaust duct, and the like.

In another example, the airflow generator 100 may produce useable electrical output when the air flow results in slow rotational speed of the magnets. The airflow generator 100 may produce useable electrical output in variable air flow velocity conditions, such as on a blustery day. In yet another example, the airflow generator 100 may operate with smaller blades. The smaller blades may reduce mass, cost, and acoustic noise of the airflow generator 100.

Figure 14:
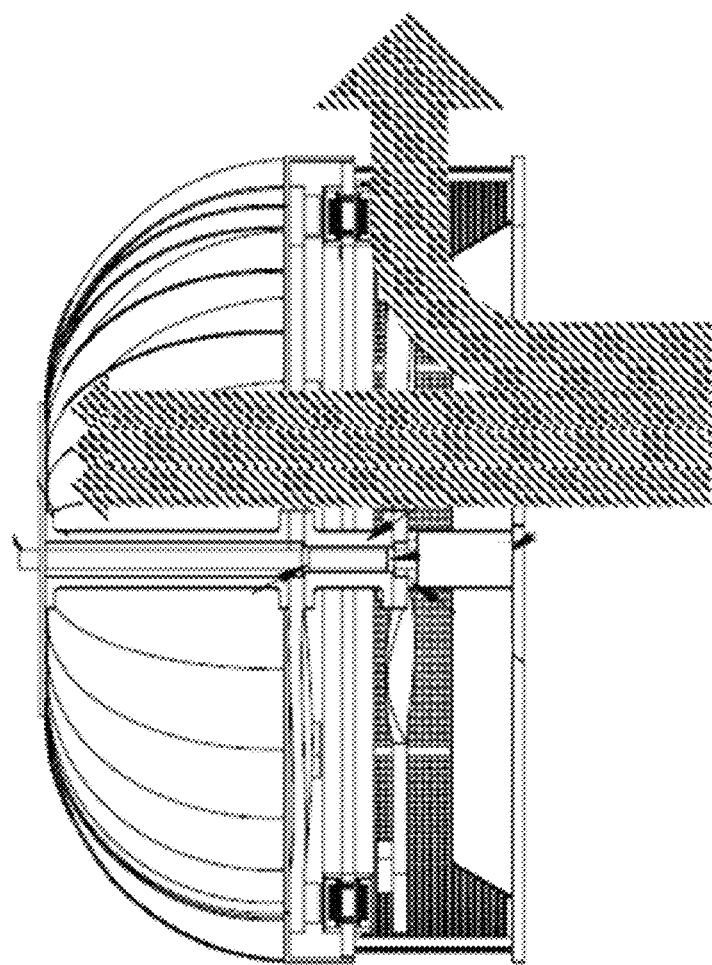
FIG. 14 depicts a side view of the airflow generator showing air flow from a man-made source.

Referring to FIG. 14, a side view of the airflow generator 100 showing air flowing from a man-made source is depicted. In an embodiment, airflow generator 100 may be configured to receive air from an air conditioner. The air conditioner fan may go from a stop condition to full rotational velocity in as little as one second or less causing a tremendous increase in air pressure directly below the plurality of cowl blades 104. Specifically, when a fan of the air conditioner may start the air may need to be allowed to freely pass out of an air outlet to avoid build up of excessive back pressure. Therefore, the venting port (item 110 from FIG. 1) may act as a free outward air flow path during fan startup as shown in FIG. 14. Further, when the airflow generator 100 may begin to rotate in response to the air flowing through it, the venting port 110 may allow for air to pass inward toward the plurality of cowl blades 104.

Figure 15:
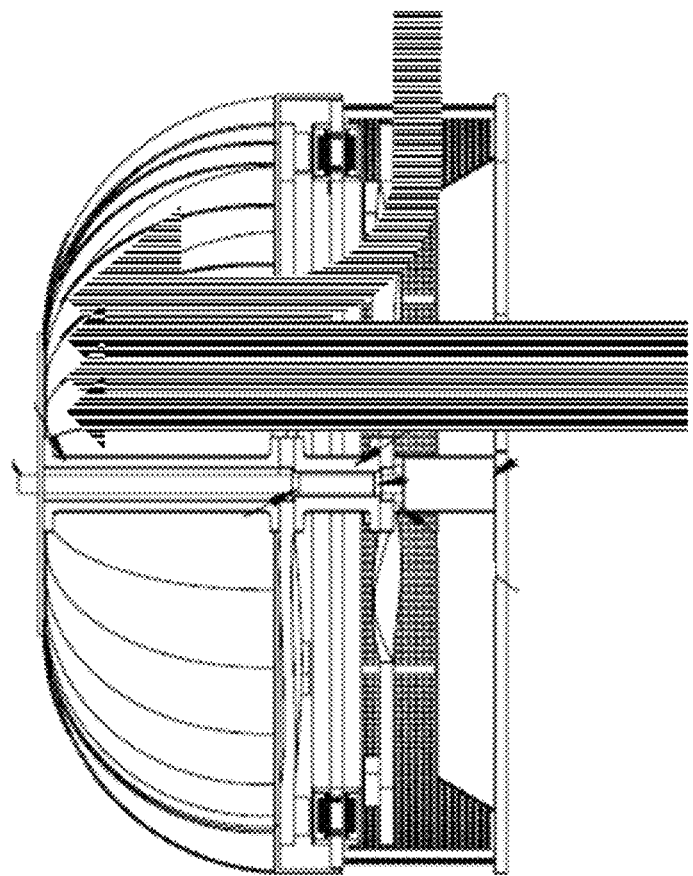
FIG. 15 depicts another side view of the airflow generator showing air flow from a man-made source.

Now referring to FIG. 15, another side view of the airflow generator 100 showing air flowing from a man-made source is depicted. Once airflow from the source (below the airflow generator in FIG. 15) is effectively moving upward through the airflow generator and existing through the ventilator cowl blade openings, the air flow may create a low pressure area proximal to the continuous flow port which may result in additional air flow being carried through the flow port to facilitate improved efficiency of electricity generation.

In an embodiment, the airflow generator 100 may provide approximately 92% conversion efficiency. Representative AC power that may be supplied to a load from the airflow generator may be approximately 500 Watts at 400 RPM of the turbine blades and magnets. In another embodiment, if the airflow generator 100 is run for four hours time per day at 400 RPM, the daily energy output may be in the range of 2 KW-Hours (60 KW-Hours per month). In yet another embodiment, if the airflow generator 100 is run for twelve hours of run time per day at an average of 200 RPM, the daily energy output may be 3 KW-Hours (90 KW-Hours per month). In still another embodiment, if the airflow generator 100 is run for eighteen hours of run time per day at an average of 300 RPM, the daily energy output may be 6.75 KW-Hours (202.5 KW-Hours per month). Further, if the airflow generator 100 is run for twenty four hours of run time per day at approximately 400 RPM, the daily energy output may be 12 KW-Hours (360 KW-Hours per month). The above embodiments are merely representative of one embodiment of the airflow generator. Different configurations of magnetics, stator coils, overall diameter, turbine blade geometry, weight, and the like may contribute to different performance results.

Further, the airflow generator 100 may be assembled using recycled materials, such as thermoplastics, and relatively simple and inexpensive components. An advantage of the airflow generator is that it may be constructed to be adaptable to existing structures and infrastructure with ease of installation in a variety of applications.

As mentioned herein, the airflow generator 100 may be configured to receive air from various sources of air flow. The various sources of air flow may include winds, man-made air supply streams, thermal currents, waste streams, and the like. The waste streams may include, but are not limited to, an exhaust such as a laboratory exhaust, a chimney, paint booth ventilation exhaust, an air conditioner outlet, an air exchange source, and the like.

In addition to the above sources, other sources such as supply air, re-circulated air, return air, exhaust ventilation, outdoor air, air flowing in a building exfiltration system, air flowing in or out of a canal or aqueducts, and air flowing around or through a moving vehicle such as a land-based vehicle, a ship, or a plane may be used by the airflow generator 100 to produce electricity. The sources of air flow may be explained later in detail in conjunction with applications of the airflow generator 100.

Figure 16:
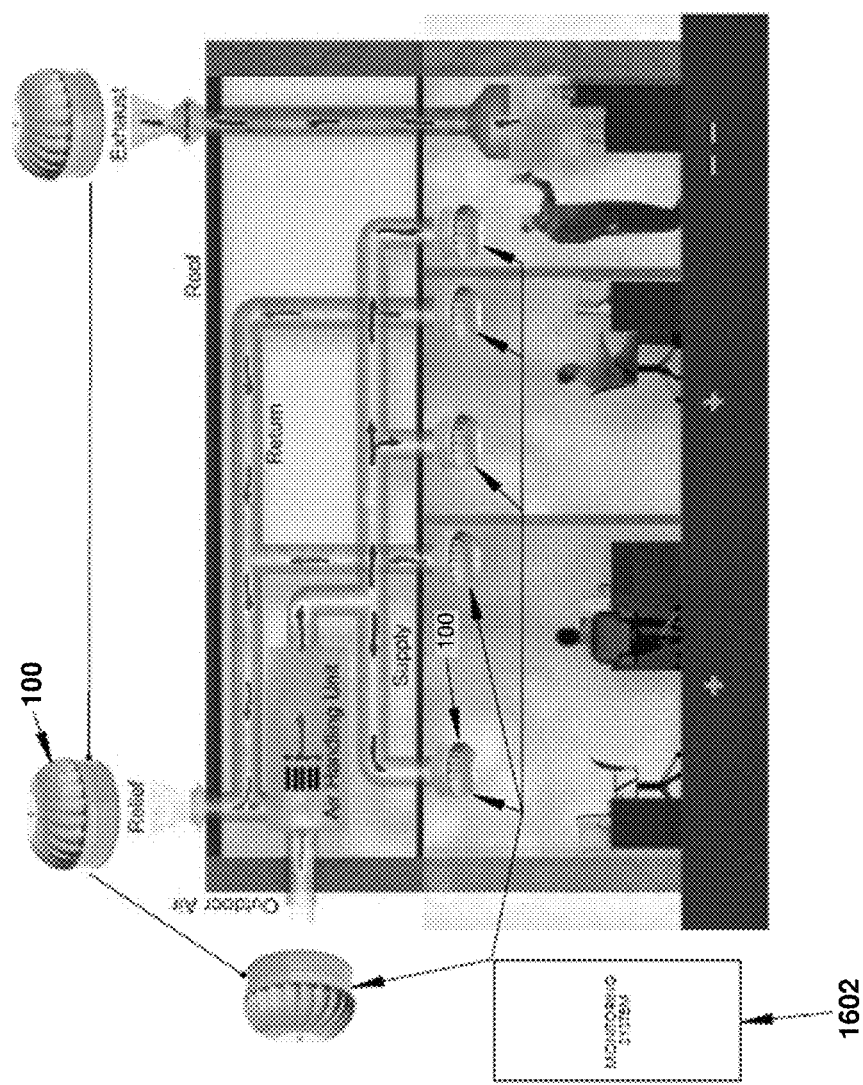
FIG. 16 depicts a perspective schematic view of the airflow generator in an industrial environment.

Now referring to FIG. 16, a perspective schematic view of the airflow generator 100 is depicted in typical building environment. The airflow generator 100 may be provided with a monitoring system 1602. The monitoring system 1602 may support the conversion of DC to AC that may be utilized in a variety of applications. Further, the converted AC may be at any required voltage and frequency that may be typically provided with the use of appropriate transformers, switching, and control circuits, while providing a continuous performance analysis and/or execution of system operations software. The monitoring system 1602 may also detect if any of the plurality of stator coils may not be operating properly.

In embodiments, the airflow generator 100 may include sensors disposed at various components to detect information about working conditions of the components. The information may be sent to the monitoring system 1602 via a suitable transmission mode. The transmission mode may include, but is not limited to, a wired mode, a wireless mode, and a mesh network. The monitoring system 1602 may analyze the information and provide a suitable output to an operator, take a suitable action, and the like. As is shown in FIG. 13, the monitoring system 1602 may be located remotely from the airflow generator 100 such as at a central location. Further, as mentioned herein, the airflow generator 100 may be used with various sources of air flow, such as an inlet vent of outdoor air into an air handling unit, an air relief/return flow of the air handling unit, a points of air outlet or return in individual rooms, common spaces such as hallways and the like, exhaust/stack outlet from various heat producing activity such as cooking, processing material, and the like. Electricity generated in any individual room may be used locally within the room, and/or merged with the electricity from other such airflow generates so deployed for use anywhere within or related to a deployment building/facility.

Figure 17:
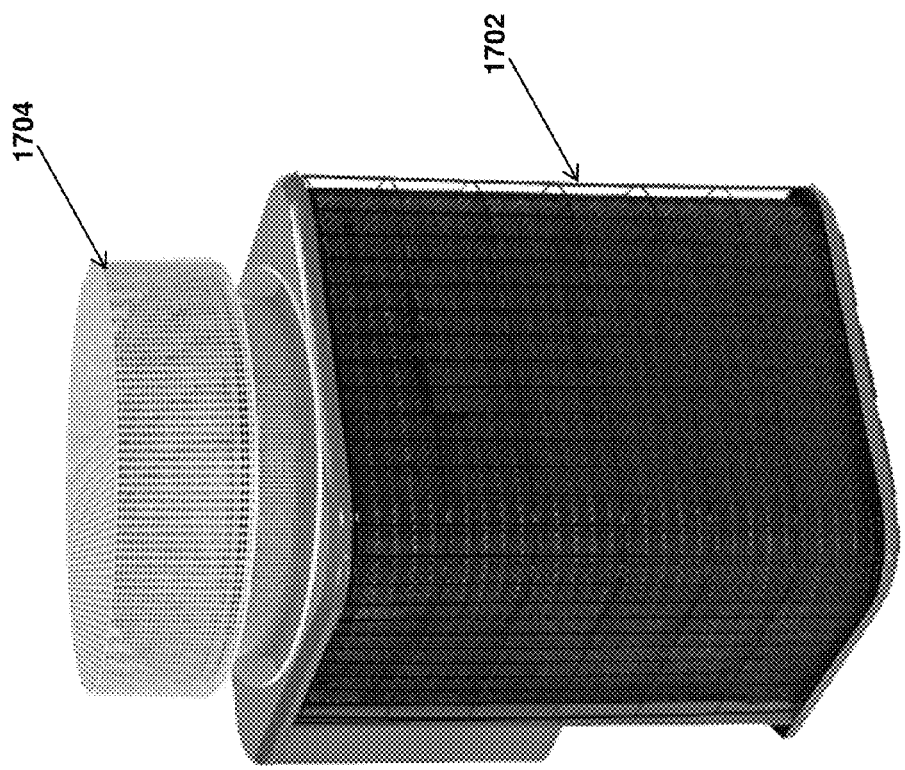
FIG. 17 depicts an application of the airflow generator.

Referring to FIG. 17, an application of the airflow generator 100 is depicted. The airflow generator 100 may be installed with an air conditioner 1702. Specifically, the airflow generator 100 may be mounted near an outdoor condenser unit of the air conditioner 1702. It will be evident to a person skilled in the art that the air conditioner 1702 may be used in any type of a building such as a residential building, a commercial building, a recreational building, an institutional building, a cultural building, and the like. In embodiments, the commercial building may include an office, a hotel, a bank, a retail shop, and the like. The recreational building may include a stadium, a gymnasium, a sports dome, a club, a theater, and the like. The institutional building may include a school, a college, a university, a hospital, a diagnostic center, and the like. Further, the industrial building may include a factory, a warehouse, a mill, a manufacturing plant, and the like. Although examples of various types of buildings and structures are listed here, the lists are merely exemplary and are not intended to limit the potential applications of the airflow generator 100.

In embodiments, the airflow generator 100 may include a safety guard shield 1704 disposed around the plurality of cowl blades 104 that may prevent accidental interference with the swiftly rotating plurality of cowl blades 104.

Figure 18:
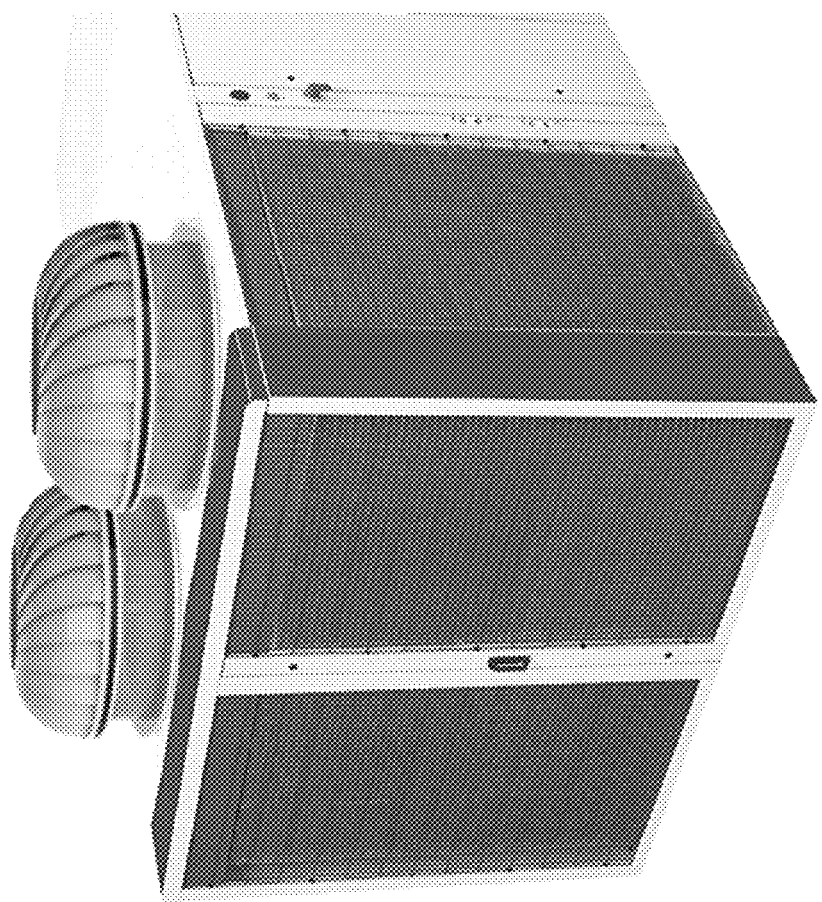
FIG. 18 depicts another application of the airflow generator.

Now referring to FIG. 18, yet another application of the airflow generator 100 is depicted. In an embodiment, two airflow generators may be mounted on a roof-top type commercial air conditioner unit.

In an embodiment, the airflow generator 100 may be deployed with an air flow generating machine such as an air conditioner fan, a blower, a circulating fan, an air conditioner outlet, an air conditioner inlet, and the like. The airflow generator 100 along may convert the air flowing out of the machine into electricity that may be returned to an AC utility power grid, may power circuits within the air conditioner, may be used to charge a back-up battery (e.g. to run the air conditioner temporarily if power were to go out), and the like.

In an embodiment, the electricity generated by the airflow generator 100 may be fed back to the air flow generating machine such as an air conditioner, for energizing portions of the air flow generating machine. In an example, the electricity generated from an air conditioner condenser may be used to provide power to a pump that may move the working fluid through a condenser. In another example, the electricity generated from a blower may be used to provide power to a display unit.

Figure 19:
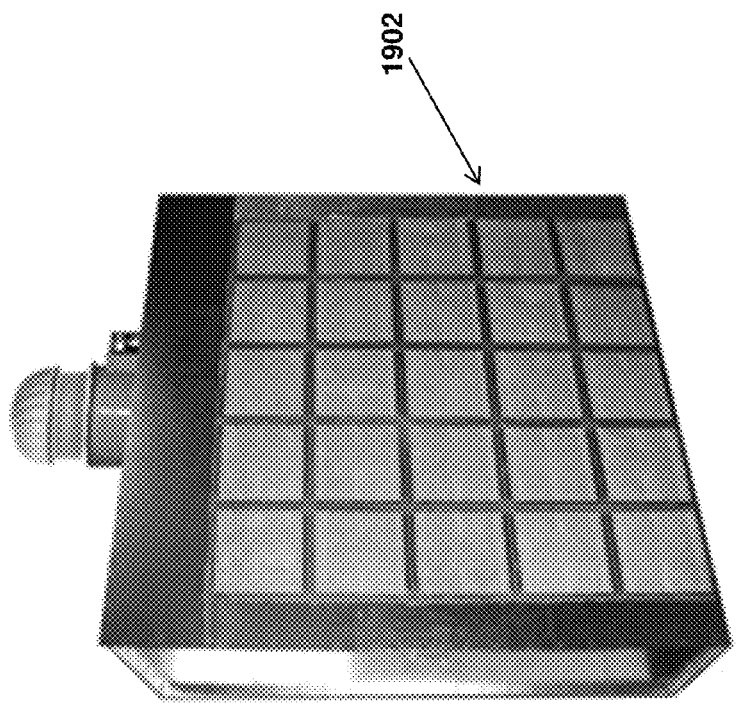
FIG. 19 depicts yet another application of the airflow generator.
Figure 20B:
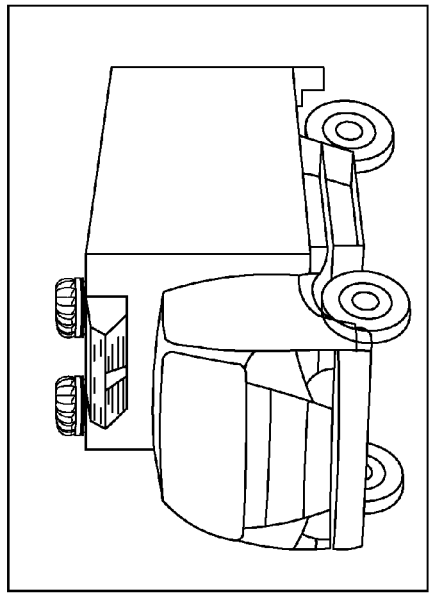
FIGS. 20A through 20L depict various mobile applications of the airflow generator.
Figure 20D:
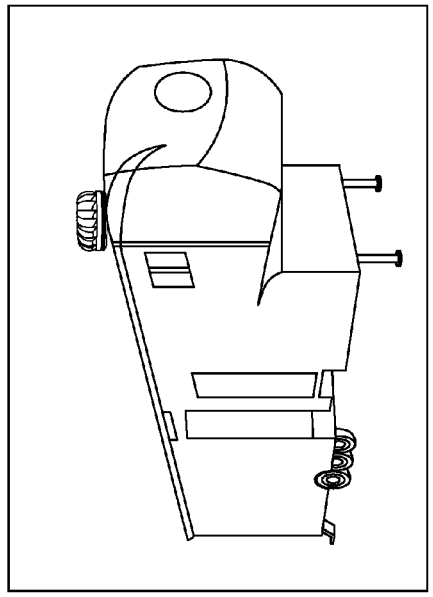
Figure 20A:
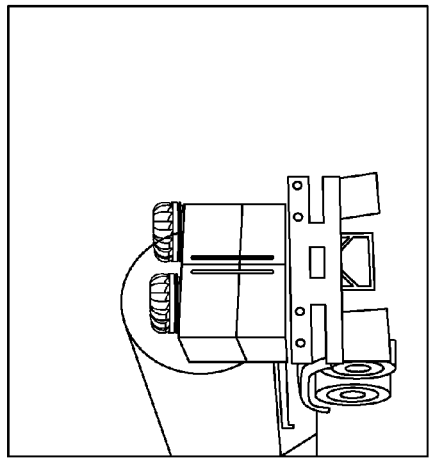
Figure 20C:
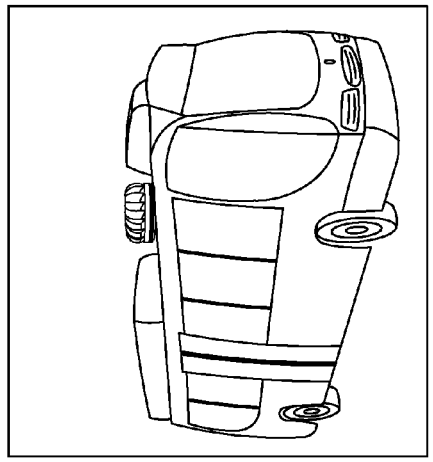
Figure 20F:
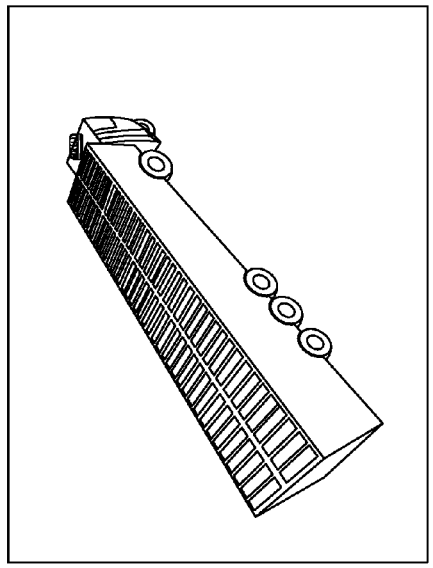
Figure 20H:
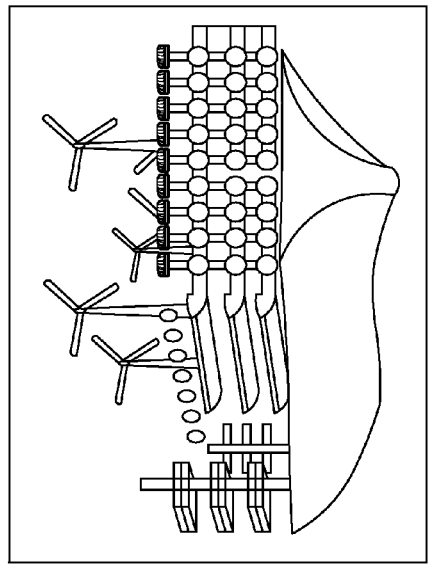
Figure 20E:
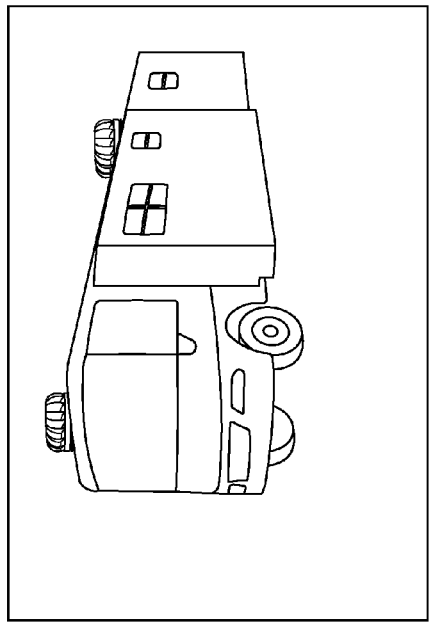
Figure 20G:
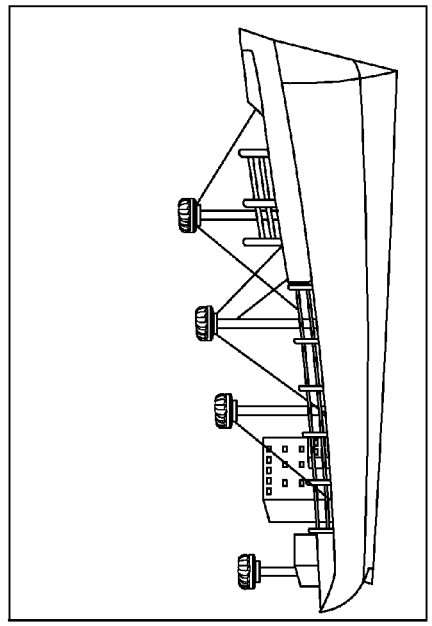
Figure 20I:
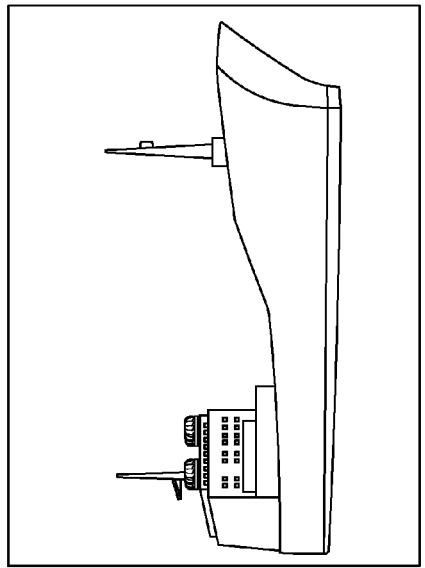
Figure 20J:
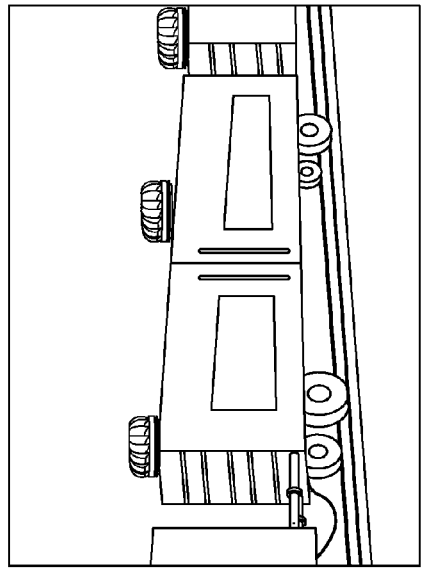
Figure 20K:
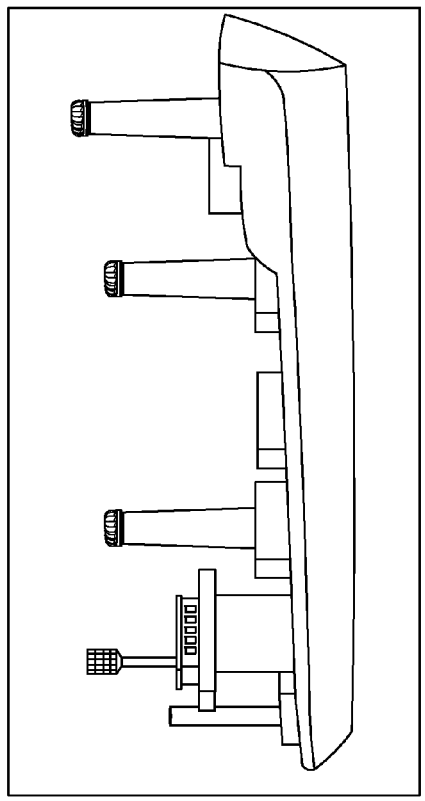
Figure 20L:
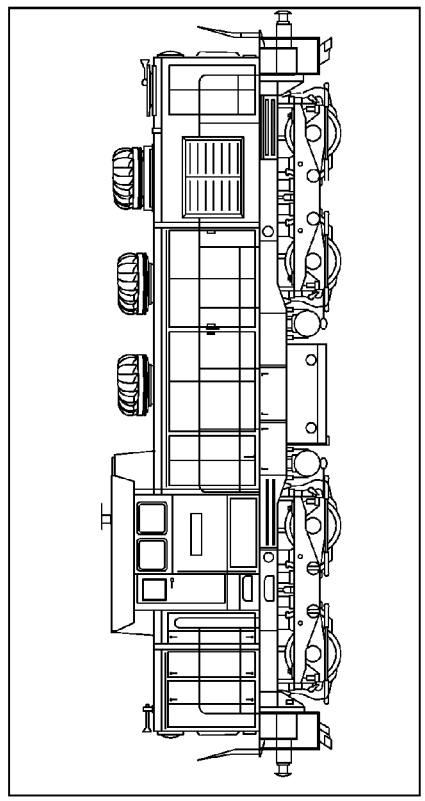

Now referring to FIG. 19, another application of the airflow generator 100 is depicted. The airflow generator 100 may be installed with an environmental chamber 1902 such as a semiconductor fabrication clean room, a regulatory testing facility, and the like. In an embodiment, the airflow generator 100 may be placed near air ducts of the environmental chamber 1902. The air ducts may be configured near the refrigeration units, and the like.

In an embodiment, the airflow generator 100 may be placed over an existing air outlet of a commercial building to generate electricity. Further, the airflow generator 100 may be placed in-line with an air plenum or a passageway, such as a tunnel, an underpass, a chute, an aqueduct, a canal, and the like. The air received from the air passageway may be used for rotating a rotatable portion of the airflow generator 100 by means of a ventilator cowl. The plurality of permanent magnets 324 may be disposed on the rotatable portion and may facilitate conversion of the air flow into electricity by means of the plurality of stator coils. The airflow generator 100 may facilitate recovery of waste heat that may be produced in a process, such as during electricity generation (e.g. a gas turbine generator). The waste heat may be routed to the airflow generator 100 and which may improve the electricity generating system efficiency.

In addition to the applications of the airflow generator 100 mentioned above, the airflow generator 100 may be used in various other applications. The airflow generator 100 may operate or adapted to operate with a paint booth ventilation system. Further, the airflow generator 100 may operate in or be adapted to operate with a make-up water treatment intake or exhaust ventilation system.

In an alternate embodiment, the plurality of cowl blades 104 may be adapted for use as part of a water turbine that uses water flows to supplement air flows through the turbine blade portion of the airflow generator. Other water-related uses may include air intake ports on canals, water cannons, hydroelectric dams, acqueducts, and the like. The airflow generator may be constructed so that it may be able to operate by receiving air flowing in or out of an air inlet port of canals, aqueducts, or the like.

Further, the airflow generator 100 may operate on a residential or commercial roof top using natural occurring wind. In an embodiment, the airflow generator 100 may be mounted on rooftops. The airflow generator 100 may be mounted so that it can work cooperatively with roof-top mounted solar panels. In an example, the airflow generator 100 may be deployed on a stand above the rooftops. In another example, the airflow generator 100 may be deployed along a roof's edge next to a parapet wall. These exemplary building roof top deployments are not limiting as many other deployments are possible including alongside walls, and the like.

Further, the airflow generator 100 may be mounted on the rooftop in combination with a solar panel. This may facilitate conversion of wind and solar energy into electricity. The electricity from the solar panel may be used to power a starter motor that may help in starting up the airflow generator 100. This may reduce the back flow air pressure on a machine that is providing the air flow. In another embodiment, the airflow generator 100 may be used directly with existing solar panel battery charging systems to store the electricity generated by an airflow generator. The electricity may be stored in batteries that may be used for later use or when there is no air flow and/or solar energy.

In an embodiment, the airflow generator 100 may be integrated into a Heating, Ventilating, and Air Conditioning (HVAC) system to generate electricity from cooled or heated air flows that may be supplied to a living or a work space. Further, the airflow generator 100 may be used in conjunction with a motor such that the airflow generator 100 may be driven by air or mechanical force. Accordingly, the airflow generator 100 may operate with low or high pressure air flows.

In embodiments, the airflow generator 100 may be mounted at top of a chimney or a duct. Further, the airflow generator 100 may be placed in-line with an attic ventilation fan, whole house fan, window fan, forced air heating/cooling system fan, and the like. The airflow generator 100 may also be mounted with various outlet and inlet systems such as clothes dryer vent output, attic convection air flow through ridge vent, a bathroom exhaust vent outlet, and the like.

The airflow generator 100 may be deployed on a moving vehicle that may facilitate generation of electrical energy that may be used to operate a portion of the vehicle. The vehicle may include a ship, a barge, a ship, a ferry, a barge, a boat, a trawler, a watercraft, a yacht, a marine vessel, a commercial vessel, a riverboat, a bus, a truck, a cargo van, a mobile home, a trailer, a tractor, a recreational vehicle, an aircraft, a hovercraft, a transport plane, a military plane, a commercial plane, a jet, and the like. Further, the airflow generator 100 may utilize the electricity produced due to deployment on the vehicle for providing power to items such as air conditioners, audio systems, video systems, seat heaters, defoggers, lights, lighted signage, water purification systems, refrigeration unit, batteries, and the like.

In an embodiment, the vehicle as mentioned above may be operated for a period of time by using the generated electricity. This may include directly operating the items or the vehicle and it may also include storing the electrical energy. The electricity may be stored in a battery, capacitive storage facility, and the like. Further, the stored electricity may be used by the items or the vehicle at a later time. In an example, the stored electricity may be used for keeping an air conditioner operating while a motor home may be stopped at a rest area and the motor is turned off.

Now referring to FIGS. 20A through 20L, various exemplary mobile applications of the airflow generator 100 are depicted. In an embodiment, the airflow generator 100 may be mounted on an exterior portion of the vehicles to capture wind passing around the vehicles. In an example, as shown in FIGS. 20A-20L, the airflow generator 100 may be mounted on a rear of a truck, a cargo van, a city bus, a camper/trailer, mobile home, a refrigeration truck, a variety of ships, a locomotive, and a railcar respectively. In another example, the vehicle may include a hybrid electric vehicle (HEV). The airflow generator 100 may be mounted on a spoiler of the HEV for capturing wind passing around the HEV. The captured wind may be converted into electricity that may be used to power a battery of the HEV.

In another embodiment, the airflow generator 100 may be mounted on an interior portion of the vehicles to capture wind passing through the vehicles. For example, the airflow generator 100 may be deployed within a plane for capturing additional air that may be generated by an air conditioner. The electricity produced by the captured air may be used as a back-up power for providing electricity to lightings within the plane. Air may pass through a vehicle to maintain aerodynamic stability. Such air may be channeled to the airflow generator 100 to produce useable electricity such as to control non-essential electronic items such as a radio, vanity lights, and the like.

In an embodiment, the airflow generator 100 may be disposed near an exhaust outlet of the vehicle. Further, the airflow generator 100 may be mounted on top of a vertical exhaust stack, an air inlet to engine, an air circulation system, and the like, of the vehicle.

The electricity generated by the airflow generator 100 may be used as an auxiliary power. Alternatively, the generated electricity may be a primary source of power for a specific use (e.g. remote control window shades) and therefore may not require power from a source such as the engine of the vehicle.

In embodiments, the airflow generator 100 may generate large currents that may be easily converted to specific DC voltages, AC voltages, and the like. In an example, if the airflow generator 100 is being driven by a known source of air that may produce a reasonably consistent turbine RPM such as an air conditioner condenser cooling fan, the airflow generator 100 may be adapted to produce AC electricity that may be directly coupled back into a main power source for a home and/or returned to the power grid.

Similarly, the DC that may be generated directly from the magnetic induction may be used to power portions of the air conditioner condenser cooling fan providing the air that may be converted into electricity by the airflow generator 100. In the example, although a primary power input to an air conditioning system is typically AC (often 220V AC), many components in such an air conditioning system is operated at DC voltage that may be generated from the primary AC. The airflow generator 100 may facilitate the primary input AC to operate the fan that may provide air flow to the airflow generator 100. Further, at least a portion of the DC voltage-based air conditioner components may be driven directly from DC output of the airflow generator 100.

It should be understood that these are exemplary applications only and various sizes and configurations of the airflow generator 100 may be adapted to be deployed with any moving vehicle or object to capture air passing by the vehicle as a result of the vehicle motion and convert the captured air into electrical energy. As described herein and elsewhere, the generated electricity may be directly used by accessories and other portions of the vehicle. Further, the generated electricity may be stored and may be converted to an application specific current/voltage for use, and the like.

Figure 21:
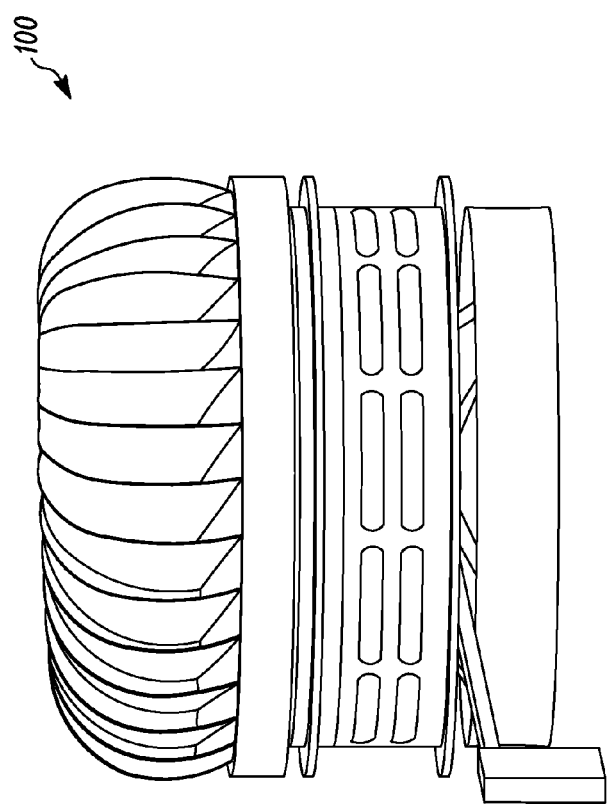
FIG. 21 depicts an exemplary embodiment of the airflow generator deployed over an exhaust fan.

Now referring to FIG. 21, an exemplary embodiment of the airflow generator 100 deployed over an exhaust fan is depicted. As mentioned herein, the airflow generator 100 may be deployed over an exhaust outlet of a vehicle. In embodiments, the airflow generator 100 may be deployed over exhaust systems of coal mines, covered parking lots, industrial air handling systems, and the like. The airflow generator 100 may be attached directly to an exhaust or may be placed at some distance from the exhaust, and in relation to an exhaust duct.

Figure 22:
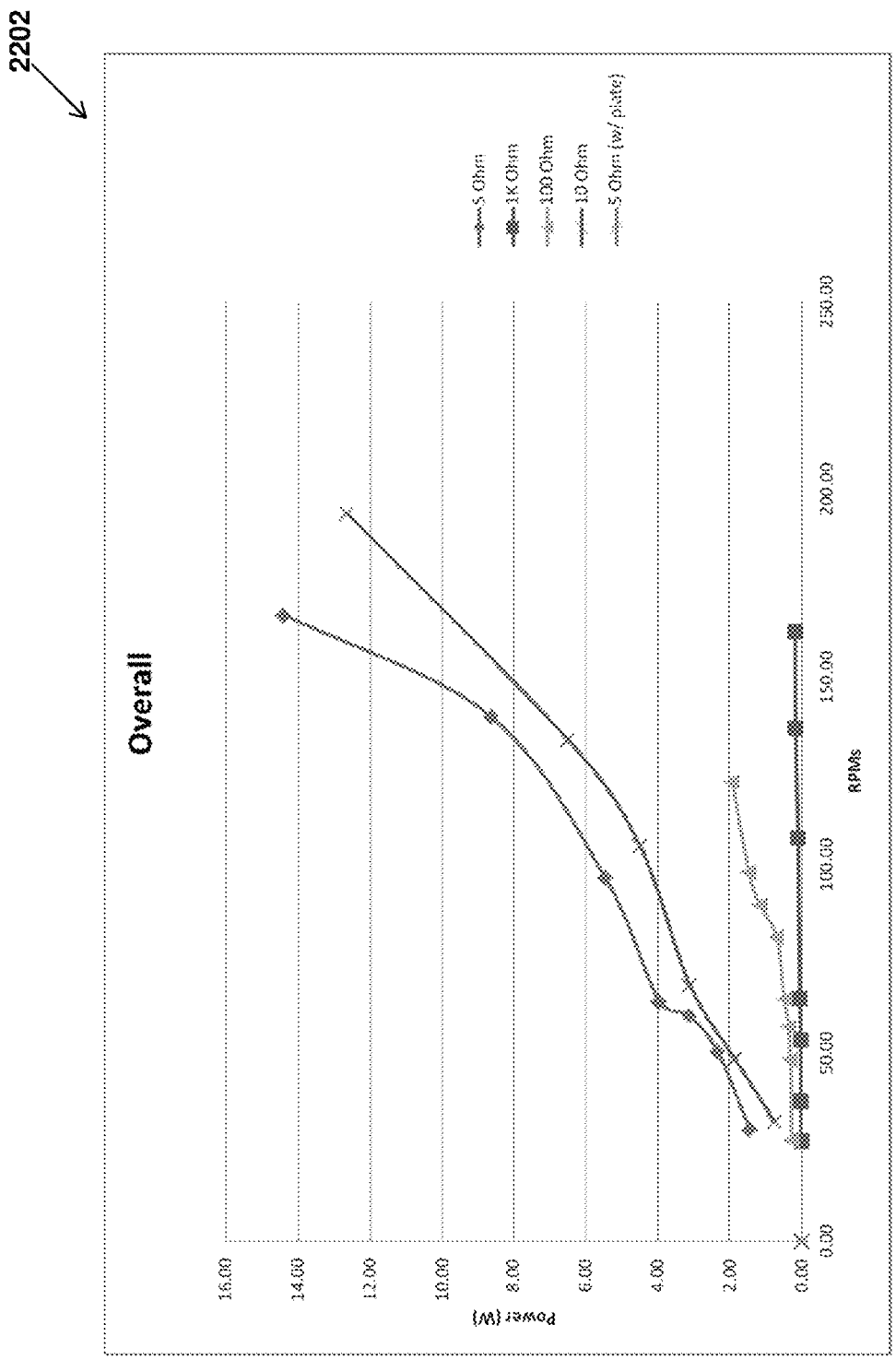
FIG. 22 depicts a chart of representative power generation capability for various output loads.

FIG. 22 depicts a chart 2202 of representative power generation capability for various output loads. The chart 2202 illustrates that the power generation capability of the airflow generator 100 may depend on the air flow received. Accordingly, more input air flow to the airflow generator 100 may result in more power generation output. For example, the air flow received from an air outlet of a consumer window fan may be less than the air flow received from an air outlet of an industrial mine. Therefore, more electrical energy is expected to be generated for the industrial mine application than for the consumer window fan application. FIG. 22 also includes power output curves for various air flow induced RPMS as well as for various load resistance values. Generally the curve indicates that the anticipated power output is inversely proportional to the load resistance for any given RPM.

Figure 23:
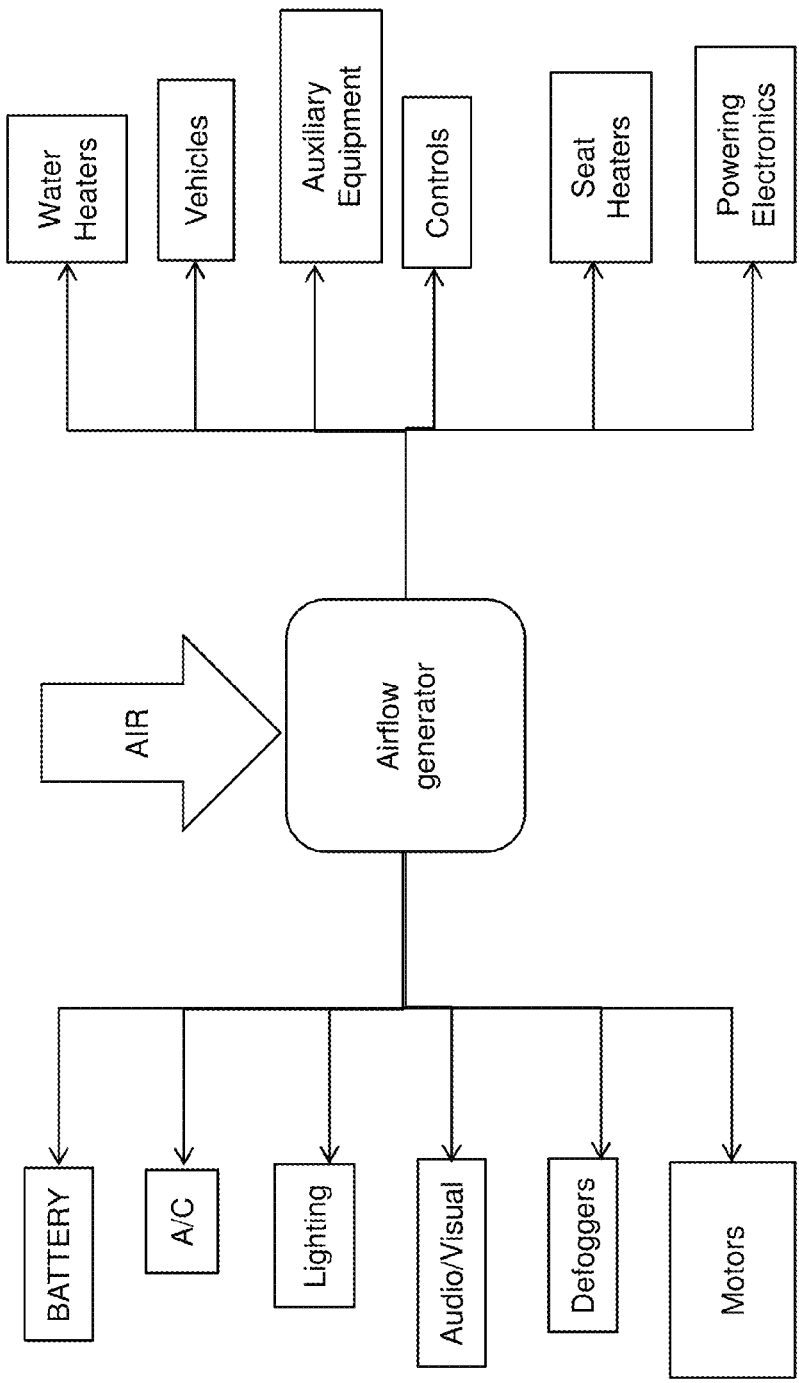
FIG. 23 depicts optional uses of electricity generated by the airflow generator.

FIG. 23 depicts optional uses of electricity generated by the airflow generator 100. The electricity generated by the airflow generator 100 may be used for powering units such as air conditioners, water heaters, auxiliary equipment, lighting, motors, control mechanisms, audio systems, seat heaters, defoggers, operating a vehicle such as by providing a battery, and the like. The DC electricity generated from the airflow generator may be advantageously applied to low voltage DC lighting such as LED-based lights, DC powered incandescent lights, DC halogen lights, DC fluorescent lights, and the like. A modestly sized airflow generator may provide electricity for home/consumer use of low voltage lighting such as kitchen accent lighting, exterior walkway and entrance way lighting, property markers, lighting for plants, walls, showcases, and the like. In many cases, total low voltage (e.g. DC)

lighting demand for a home may be provided by the airflow generator from common airflow sources such as an air conditioner condenser fan, a whole house fan, an attic exhaust fan, roof-top wind, roof convection currents, and the like. When combined with other renewable energy sources, such as solar, the airflow generator my provide a source of battery regarding energy that may be used to charge a battery that may provide power to DC lighting systems in homes, schools, and any other building, facility, outdoor venue, and the like.

Figure 24:
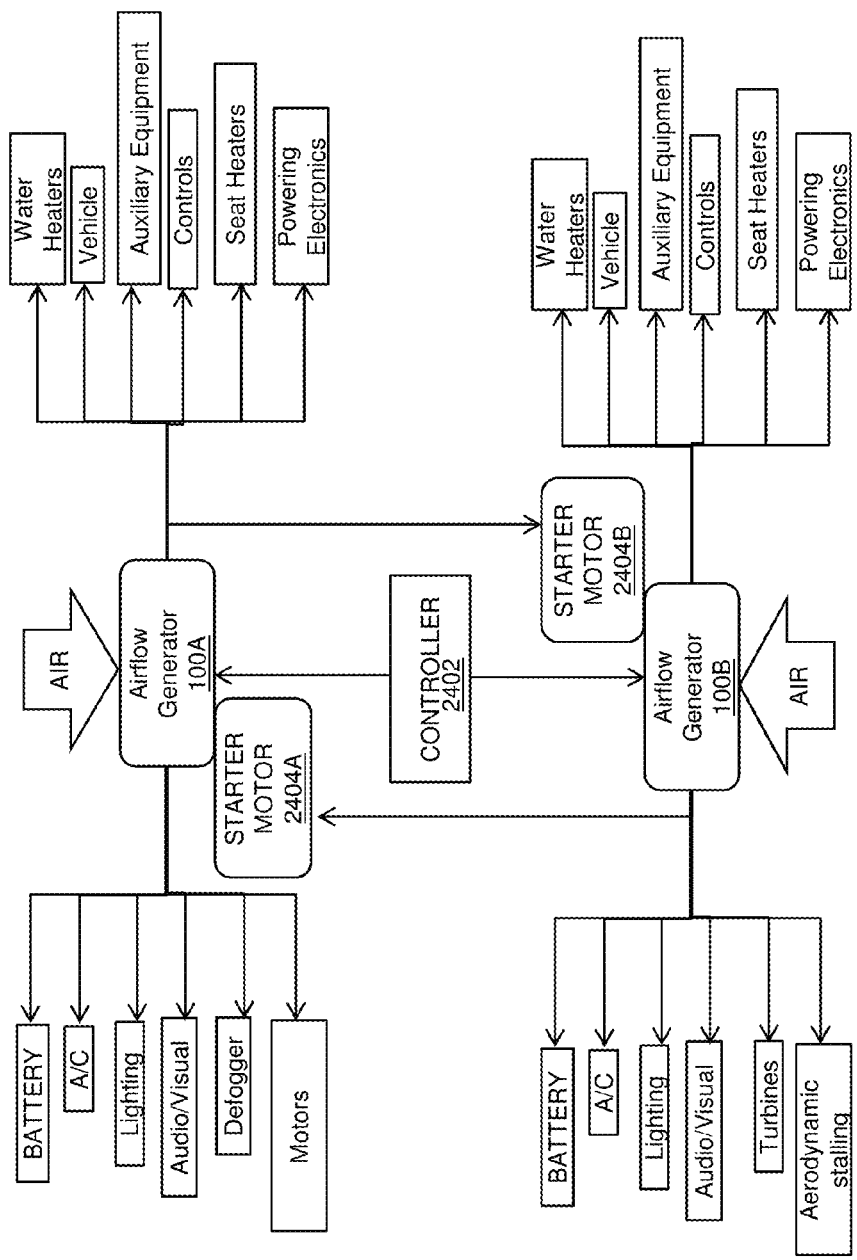
FIG. 24 depicts multiple airflow generators configured with a controller.

FIG. 24 depicts multiple airflow generators configured with a controller 2402. In an embodiment, the multiple airflow generators may be configured to produce greater amounts of electrical energy. The multiple airflow generators may include airflow generators 100A and 100B that may be electrically interconnected to provide electrical energy generated from air flowing through at least one of two airflow generators 100A and 100B. Further, a controller 2402 may be connected to the airflow generator 100A and the airflow generator 100B. The two airflow generators 100A and 100B may facilitate energizing a starter motor such as 2404A and 2404B to facilitate startup of the two airflow generators 100A and 100B.

The invention claimed is:

1. A method of converting an air flow into a source of electricity, the method comprising:
   receiving the air flow generated by a machine with an airflow generator comprising an airflow inlet port and a ventilator cowl disposed in an air flow path of the machine;
   disposing a plurality of permanent magnets on a rotatable portion of the airflow generator, the ventilator cowl configured to facilitate rotating the rotatable portion in response to the received air flow;
   continuously venting the air flow, via a venting port that is generally perpendicular to the air flow path and arranged between the ventilator cowl and the inlet port to both mitigate the airflow generator induced backpressure and augment air flow toward a rotatable portion of the airflow generator; and
   converting the air flow to electricity by the rotatable portion moving the plurality of permanent magnets in close proximity to a plurality of stator coils that are disposed on a stationary portion of the airflow generator.

2. The method of claim 1, wherein the machine is selected from at least one of an air conditioner condenser, a blower, a furnace, an air conditioner, a gas turbine, and a fan.

3. A method of converting an air flow into a source of electricity, the method comprising:
   receiving the air flow generated by a machine with an airflow generator disposed in an air flow path of the machine;
   continuously venting the air flow to both mitigate the airflow generator induced backpressure and augment air flow toward a rotatable portion of the airflow generator;
   disposing a plurality of permanent magnets on the rotatable portion of the airflow generator that is rotatable in response to the received air flow; and
   converting the air flow to electricity by the rotatable portion moving the plurality of permanent magnets in close proximity to a plurality of stator coils that are disposed on a stationary portion of the airflow generator.

4. The method of claim 3, further comprising a venturi air flow restrictor disposed in the air flow between the machine and the rotatable portion of the airflow generator.

5. The method of claim 3, wherein the airflow generator is disposed proximal to an air outlet port of the machine, wherein the air flow includes air that has passed through the air outlet port.

6. The method of claim 3, wherein the airflow generator is disposed proximal to an air inlet port of the machine, wherein the air flow includes air that is flowing into the air inlet port.

7. The method of claim 3, wherein the machine is selected from at least one of an air conditioner condenser, a blower, a furnace, an air conditioner, a gas turbine, and a fan.

8. The method of claim 3, wherein the airflow generator further comprises a fixed drive shaft configured to facilitate rotation of the rotatable portion.

9. The method of claim 3, wherein the machine is selected from an air conditioner condenser, a blower, a furnace, an air conditioner, a gas turbine, and a fan.

10. The method of claim 3, wherein the continuous venting is facilitated by a continuous venting port.

11. The method of claim 10, wherein the continuous venting port is disposed between the machine and the rotatable portion of the airflow generator.

12. The method of claim 10, wherein air flows outward through the continuous venting port when the air flow generated by the machine is less than 12,000 cubic feet per minute.

13. The method of claim 10, wherein air flows inward through the continuous venting port when the air flow generated by the machine is more than 13,000 cubic feet per minute.

14. The method of claim 10, wherein the continuous venting port is adapted to transfer energy from ambient air currents to the airflow generator.

15. The method of claim 14, wherein the ambient air currents do not require generation by the machine.

16. The method of claim 3, wherein the plurality of permanent magnets are disposed along a circumference of a rotating portion of the airflow generator.

17. The method of claim 16, wherein the plurality of permanent magnets are disposed at substantially equal distances from one another along the circumference.

* * * * *